United States Patent
Fan

(10) Patent No.: US 12,017,355 B2
(45) Date of Patent: *Jun. 25, 2024

(54) GRASP LEARNING USING MODULARIZED NEURAL NETWORKS

(71) Applicant: FANUC CORPORATION, Yamanashi (JP)

(72) Inventor: Yongxiang Fan, Union City, CA (US)

(73) Assignee: FANUC Corporation, Yamanashi (JP)

(*) Notice: Subject to any disclaimer, the term of this patent is extended or adjusted under 35 U.S.C. 154(b) by 444 days.

This patent is subject to a terminal disclaimer.

(21) Appl. No.: 17/342,069

(22) Filed: Jun. 8, 2021

(65) Prior Publication Data
US 2022/0388162 A1 Dec. 8, 2022

(51) Int. Cl.
*B25J 9/16* (2006.01)
*G06N 3/045* (2023.01)
(Continued)

(52) U.S. Cl.
CPC .............. *B25J 9/1612* (2013.01); *B25J 9/16* (2013.01); *B25J 9/161* (2013.01); *B25J 9/163* (2013.01);
(Continued)

(58) Field of Classification Search
CPC ........ B25J 9/1669; B25J 9/1605; B25J 9/161; B25J 9/1612; B25J 9/1671; B25J 9/1697; B25J 9/163; B25J 15/0028; G06N 3/08; G06N 5/04; G06N 3/008; G06N 3/045; G06T 7/593; G06T 7/70; G06T 2207/10028; G06T 2207/20081;
(Continued)

(56) References Cited

U.S. PATENT DOCUMENTS 10,474,928 B2* 11/2019 N .......................... G06V 10/255
10,970,830 B2*  4/2021 Zhang .................... G06T 5/009
(Continued)

OTHER PUBLICATIONS

"Grasping of unknown objects using deep convolutional neural networks based on depth images" by Philipp; IEEE international conference on robotics and automation. (Year: 2018).*
(Continued)

*Primary Examiner* — Sohana Tanju Khayer
(74) *Attorney, Agent, or Firm* — John A. Miller; Shumaker, Loop & Kendrick, LLP

(57) ABSTRACT

A method for modularizing high dimensional neural networks into neural networks of lower input dimensions. The method is suited to generating full-DOF robot grasping actions based on images of parts to be picked. In one example, a first network encodes grasp positional dimensions and a second network encodes rotational dimensions. The first network is trained to predict a position at which a grasp quality is maximized for any value of the grasp rotations. The second network is trained to identify the maximum grasp quality while searching only at the position from the first network. Thus, the two networks collectively identify an optimal grasp, while each network's searching space is reduced. Many grasp positions and rotations can be evaluated in a search quantity of the sum of the evaluated positions and rotations, rather than the product. Dimensions may be separated in any suitable fashion, including three neural networks in some applications.

37 Claims, 11 Drawing Sheets

(51) Int. Cl.
*G06N 3/08* (2023.01)
*H04N 13/271* (2018.01)

(52) U.S. Cl.
CPC ........... *B25J 9/1669* (2013.01); *B25J 9/1697* (2013.01); *G06N 3/045* (2023.01); *G06N 3/08* (2013.01); *H04N 13/271* (2018.05)

(58) Field of Classification Search
CPC . G06T 2207/20084; G06T 7/73; G06V 20/10; G06V 20/64; G06V 10/82; G06V 20/52; G05B 19/042
See application file for complete search history.

(56) References Cited

U.S. PATENT DOCUMENTS

| | | | |
|---|---|---|---|
| 11,445,222 B1* | 9/2022 | Andreopoulos | G06N 3/045 |
| 11,460,982 B1* | 10/2022 | Knight | G06F 3/0484 |
| 11,663,483 B2* | 5/2023 | Haidar | G06F 40/216 706/15 |
| 2016/0321541 A1* | 11/2016 | Liu | G06N 3/04 |
| 2018/0268256 A1* | 9/2018 | Di Febbo | G06V 10/757 |
| 2019/0273510 A1* | 9/2019 | Elkind | G06F 21/562 |
| 2019/0332942 A1* | 10/2019 | Wang | G06F 17/13 |
| 2020/0050941 A1* | 2/2020 | Zhuang | G06N 3/044 |
| 2020/0151019 A1* | 5/2020 | Yu | G06F 9/5027 |
| 2020/0242777 A1* | 7/2020 | Jiang | G06T 7/11 |
| 2020/0302340 A1* | 9/2020 | Durand | G06N 3/045 |
| 2021/0042946 A1* | 2/2021 | Groh | G06N 3/045 |
| 2021/0049458 A1* | 2/2021 | Chang | G06F 16/212 |
| 2021/0110274 A1* | 4/2021 | Tripathi | G06F 18/10 |
| 2021/0182681 A1* | 6/2021 | Markram | G06N 3/088 |
| 2021/0204884 A1* | 7/2021 | Ravishankar | A61B 5/316 |
| 2021/0326660 A1* | 10/2021 | Krishnan | G06N 3/09 |
| 2021/0365716 A1* | 11/2021 | Li | G06V 10/764 |
| 2022/0051076 A1* | 2/2022 | Bingham | G06N 3/086 |
| 2022/0122103 A1* | 4/2022 | Qiu | G06N 3/08 |
| 2022/0147795 A1* | 5/2022 | Chu | G06F 9/5038 |
| 2022/0148204 A1* | 5/2022 | Guizilini | G01S 17/89 |
| 2022/0198616 A1* | 6/2022 | Lee | G06T 5/003 |
| 2022/0215267 A1* | 7/2022 | Oster | G06N 3/049 |
| 2022/0238128 A1* | 7/2022 | Chi | G10L 21/0272 |
| 2022/0292355 A1* | 9/2022 | Lyske | G10H 1/0008 |
| 2022/0319154 A1* | 10/2022 | Zhang | G06N 3/006 |
| 2022/0383525 A1* | 12/2022 | Sabato | G06V 10/751 |
| 2023/0065862 A1* | 3/2023 | Karabutov | G06V 10/44 |
| 2023/0067528 A1* | 3/2023 | Guo | G16C 20/70 |
| 2023/0087722 A1* | 3/2023 | Ren | G06N 3/045 706/26 |
| 2023/0181082 A1* | 6/2023 | Ravishankar | A61B 5/333 600/515 |

OTHER PUBLICATIONS

"Hierarchical 6-DoF grasping with approaching direction selection" by Choi; IEEE international conference on robotics and automation. (Year: 2020).*

Jeffrey Mahler, Matthew Matl, Vishal Satish, Michael Danielczuk, Bill Derose, Stephen Mckinley, Ken Goldberg "Learning ambidextrous robot grasping policies." Science Robotics Jan. 16, 2019, pp. 1-11, 4 eaau4984, American Association for the Advancement of Science, Washington, DC.

Douglas Morrison, Peter Corke, Jürgen Leitner, "Closing the Loop for Robotic Grasping: A Real-time, Generative Grasp Synthesis Approach", 2018 Robotics: Science and Systems (RSS), Australian Centre for Robotic Vision, Brisbane, Australia.

Jeffrey Mahler, Jacky Liang, Sherdil Niyaz, Michael Laskey, Richard Doan, Xinyu Liu, Juan Aparicio Ojea, Ken Goldberg, "Dex-Net 2.0: Deep Learning to Plan Robust Grasps with Synthetic Point Clouds and Analytic Grasp Metrics." Aug. 8, 2017, Dept. of EECS, University of California, Berkeley.

Arsalan Mousavian, Clemens Eppner, Dieter Fox "6-dof graspnet: Variational grasp generation for object manipulation." Proceedings of the IEEE International Conference on Computer Vision. Aug. 17, 2019. pp. 1-11.

https://github.com/dougsm/ggcnn/issues/17 Sep. 19, 2019.

* cited by examiner

GRASP LEARNING USING MODULARIZED NEURAL NETWORKS

BACKGROUND

Field

The present disclosure relates generally to a method for decoupling a high dimensional neural network into two or more neural networks of lower input dimensions and, more particularly, to a robot grasp learning technique using modularized neural networks which decomposes grasp degrees of freedom (DOF) into groups, and each of the grouped sets of DOF is searched individually by a neural network using specially designed data, providing full DOF grasp computations far more efficiently than a single large neural network.

Discussion of the Related Art

The use of industrial robots to perform a wide range of manufacturing, assembly and material movement operations is well known. One such application is a pick and place operation, where a robot picks up individual parts from a bin and places each part on a conveyor or a shipping container. An example of this application would be where parts which have been molded or machined are dropped into the bin and settle in random locations and orientations, and the robot is tasked with picking up each part and placing it in a pre-defined orientation (pose) on a conveyor which transports the parts for packaging or for further processing. Depending on the type of parts in the bin and other factors, finger-type graspers or suction-type grippers may be used as the robot tool. A vision system (one or more cameras) is typically used to identify the position and pose of individual parts in the bin.

It is known in the art to use trained neural network systems to compute grasping instructions for parts in a bin. However, existing neural network grasp learning systems suffer from drawbacks which limit their practical use. One known system encodes a top-down candidate grasp into an image patch and trains a network to predict the quality of a plurality of candidate grasps. This system requires a long time to compute candidate grasps, and can only produce top-down (vertical) grasps for parallel-jaw grippers. Moreover, this system cannot predict the effect of interference between parts in cluttered environments, as it is trained only with individual isolated parts/objects, not with a random jumble of parts in a bin.

Another known system removes the requirement of time-consuming grasp candidate calculation by training a network to take the original depth image and output the quality of each pixel. However, this system cannot make accurate predictions for each pixel due to the large number of pixels contained in each image. Thus, this system is not as accurate as the system discussed above. Furthermore, this system cannot handle the densely cluttered environment which is typical of parts in a bin, due to the ambiguity of gripper angle/width encoding. In addition, this system can only produce a straight top-down grasp solution. Finally, without predicting depth, this system can potentially drive the robot gripper into adjacent parts in the bin, and cause damage to the gripper or the parts.

Yet another existing system attempts to determine a six DOF grasp with a single network. However, this system cannot handle a cluttered grasping environment (such as a pile of parts) in the grasp evaluation network, and requires a grasp refinement step after the grasp evaluation in the neural network.

In light of the circumstances described above, there is a need for a method of decomposing high dimensional learning neural networks into two or more lower dimension networks, with the method being applicable to full-DOF grasp planning and other applications.

SUMMARY

In accordance with the teachings of the present disclosure, a method for decoupling or modularizing high dimensional neural networks into two or more neural networks of lower input dimensions is described and shown. The disclosed network modularization method is particularly suited to generating full-DOF robot grasping actions based on images of parts in a bin to be picked. In one example, a first network encodes grasp positional dimensions and a second network encodes grasp rotational dimensions. The first network is trained to predict a position at which a grasp quality is maximized for any value of the grasp rotations. The second network is trained to identify the maximum grasp quality while searching only at the previously-identified position from the first network. In this way, the two networks collectively identify an optimal grasp, while each network's dimensional searching space is greatly reduced. Specifically, a large number of grasp positions and rotations can be evaluated in a total number of searches equaling the sum of the evaluated positions and rotations, rather than the product. The separation of dimensions between the networks may be designed to best suit a particular application, even including three neural networks instead of two in some applications.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the present disclosure directed to robot grasp learning using modularized neural networks is merely exemplary in nature, and is in no way intended to limit the disclosed devices and techniques or their applications or uses.

The use of industrial robots for picking parts from a source and placing them at a destination is well known. In one common application, a supply of parts is provided in a bin, such as a bin full of parts which have just been cast or molded. Teaching a robot to recognize and grasp an individual part in a bin full of parts has always been challenging. Traditional methods teach robots manually in structural environments. For high dimensional tasks in unstructured environments, it is desired to learn a robust grasping skill by deep learning using a neural network trained for pattern recognition.

However, to learn a high dimensional robot task, the learning-based methods generally require encoding high dimensional states/actions and searching in high dimensional action space. For example, to learn a six degrees of freedom (DOF) general bin picking task, the neural network needs to encode the high dimensional observation and 6-DOF grasp actions before searching in the action space. This can increase the complexity of the network and introduce heavy computation load.

Concerning the challenges in high-dimensional learning, two known existing methods reduce the searching to four dimensions and constrain the approach direction of the grasps in a top-down manner. Also, these learning-based methods are either not fast enough (due to the requirement of time-consuming candidate grasp calculation) or not accurate enough (because they try to predict too many dimensions, which is difficult for neural networks). Yet another existing method uses a single neural network for a six-DOF grasp proposal, but this method suffers from high search complexity, requires subsequent grasp refinement, and cannot handle a cluttered object environment as is typical of parts in a bin.

In order to overcome the shortcomings of existing methods and systems, the present disclosure describes a technique for modularizing or decoupling large, high dimensional neural networks into two or three smaller networks of lower dimension. Using this neural network modularization technique, searching accuracy can be maintained while network performance and efficiency are greatly improved. One application for the disclosed neural network modularization technique is in robotic part grasping, where all degrees of freedom (DOF) of a grasp are computed from images of a bin full of parts, and the computed grasp exceeds a quality threshold.

Figure 1:
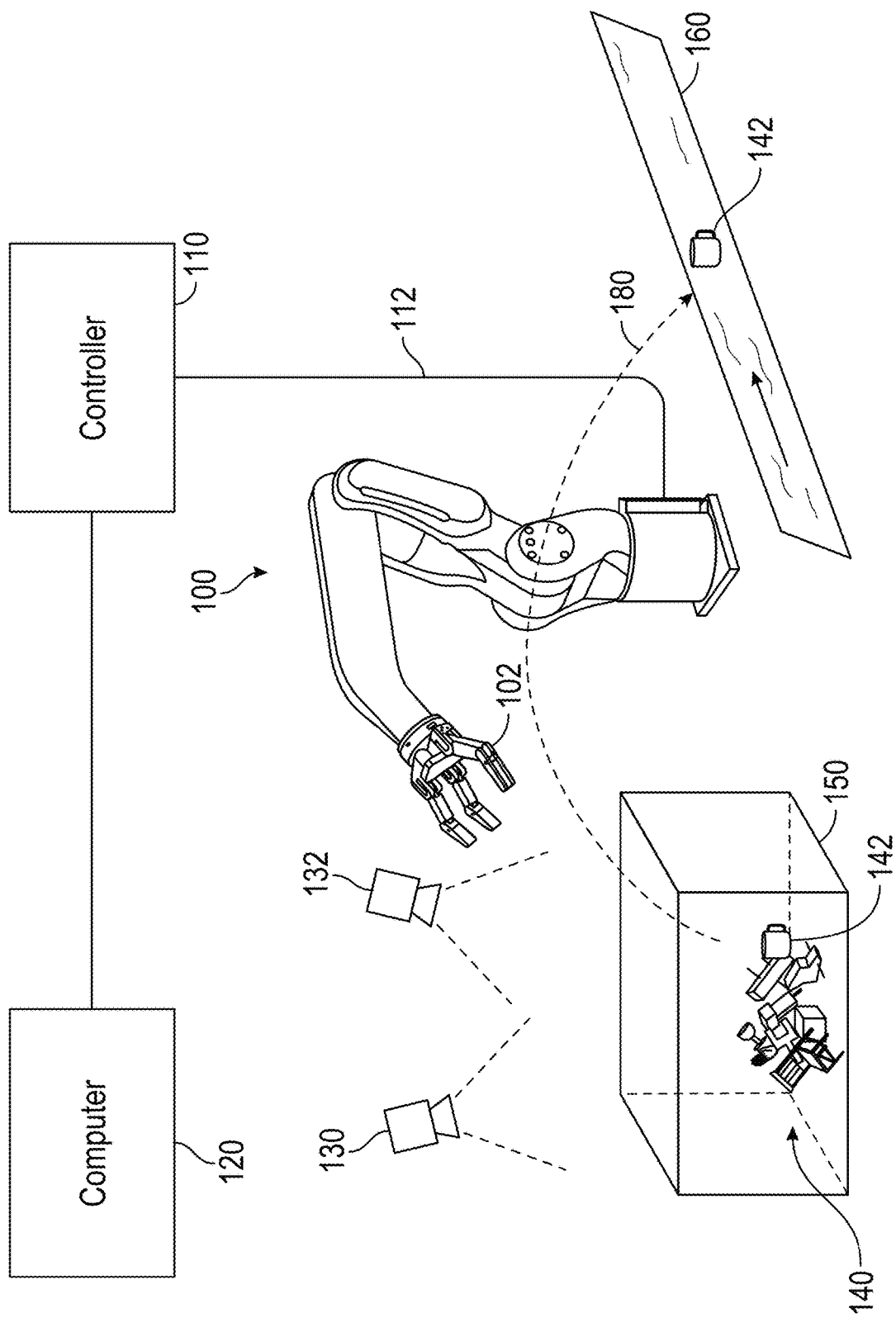
FIG. 1 is a block diagram illustration of a robotic part picking system which uses decoupled neural networks to compute full-DOF grasps, according to an embodiment of the present disclosure.

FIG. 1 is a block diagram illustration of a robotic part picking system which uses decoupled neural networks to compute full-DOF grasps, according to an embodiment of the present disclosure. The system shown in FIG. 1 is provided to illustrate an example application where the disclosed neural network modularization technique can be used. A robot 100 having a gripper 102 operates within a workspace wherein the robot 100 moves parts or objects from a first location (a bin) to a second location (a conveyor).

Motion of the robot 100 is controlled by a controller 110, which typically communicates with the robot 100 via a cable 112. The controller 110 provides joint motion commands to the robot 100 and receives joint position data from encoders in the joints of the robot 100, as known in the art. The controller 110 also provides commands to control operation of the gripper 102—including gripper rotation angle and width, and grip/ungrip commands.

A computer 120 is in communication with the controller 110. The computer 120 includes a processor and memory/storage configured with neural networks for computing a grasp proposal based on three dimensional (3D) camera images. In one embodiment, the computer 120 running the neural networks in execution or inference mode is the same computer on which the neural networks were previously trained. In another embodiment, the neural networks are trained on a different computer and provided to the computer 120 for use in live robotic grasping operations.

A pair of 3D cameras 130 and 132 communicate, via hard-wire connection or wirelessly, with the computer 120 and provide images of the workspace. In particular, the cameras 130/132 provide images of objects 140 in a bin 150. The images (including depth data) from the cameras 130/132 provide point cloud data defining the position and orientation of the objects 140 in the bin 150. When there are two of the 3D cameras 130 and 132 having different perspectives, it is possible to compute or project a 3D depth map of the objects 140 in the bin 150 from any suitable point of view. In another embodiment, only one of the 3D cameras (130) is used, such as oriented for a directly vertical line of sight.

The position of the bin 150 relative to the robot 100 is known, so that when a grasp of an object 140 at a location in the bin 150 is computed, the robot 100 can control the gripper 102 to execute the grasp. The task of the robot 100 is to pick up one of the objects 140 from the bin 150 and move the object to a conveyor 160. In the example shown, an individual part 142 is selected, grasped by the gripper 102 of the robot 100, and moved to the conveyor 160 along a path 180.

For each part picking operation, the computer 120 receives one or more images of the objects 140 in the bin 150, from the cameras 130/132. From the camera images, the computer 120 computes one or more depth maps of the pile of objects 140 in the bin 150. Using the depth maps, the neural networks running on the computer 120 determine a high quality, full-DOF grasp for one individual object in the bin 150. For example, an object on top of the pile of objects, with significant portions of its sides exposed and free from surrounding objects, would be a good grasp candidate.

When an object (such as the object 142) is identified as being in a position for a high quality grasp according to the techniques described in detail below, the computer 120 provides the individual object grasp data to the controller 110, which then commands the robot 100 to grasp and move the object. The individual object grasp data provided to the controller 110 by the computer 120 preferably includes 3D coordinates of the grasp target point, the angle of approach to be followed by the gripper 102, and the gripper angle of rotation and width (or positions of all finger joints).

Using the individual object grasp data, the controller 110 can compute robot motion instructions which cause the gripper 102 to grasp the identified object (e.g., the object 142) and move the object to the destination location along a collision-free path (the path 180). Instead of the conveyor 160, the destination location could be a shipping container in which the objects are placed in individual compartments, or any other surface or device where the objects are further processed in a subsequent operation.

After the object 142 is moved to the conveyor 160, new image data is provided by the cameras 130/132, as the pile of objects 140 will have changed. The computer 120 must then identify a new target object for grasping based on the new image data using the trained neural networks. The new target object must be identified by the computer 120 very quickly, because the object identification and path computation must be performed in real time as fast as the robot 100 can move one of the objects 140 and return to pick up the next. The efficient searching provided by lower-dimensional modularized neural networks enables the fast grasp computation needed in this grasping application.

The application described above in the system of FIG. 1 preferably uses a seven degrees of freedom (DOF) grasp proposal from the computer 120. In one embodiment, the seven DOF include two DOF for approach direction (x and y components combined with a unit downward z movement of the robot gripper), three DOF for grasp location (x/y/z coordinates), and two more DOF for gripper rotation/spin angle and gripper width. In order to provide the seven DOF grasp proposal based on images of a bin full of parts, the computer 120 can advantageously use the disclosed neural network modularization techniques to separate the grasp search dimensions into two or even three networks. The general concepts of the disclosed neural network modularization are discussed below, followed by examples of the network modularization applied to robotic grasping applications.

Figure 2:
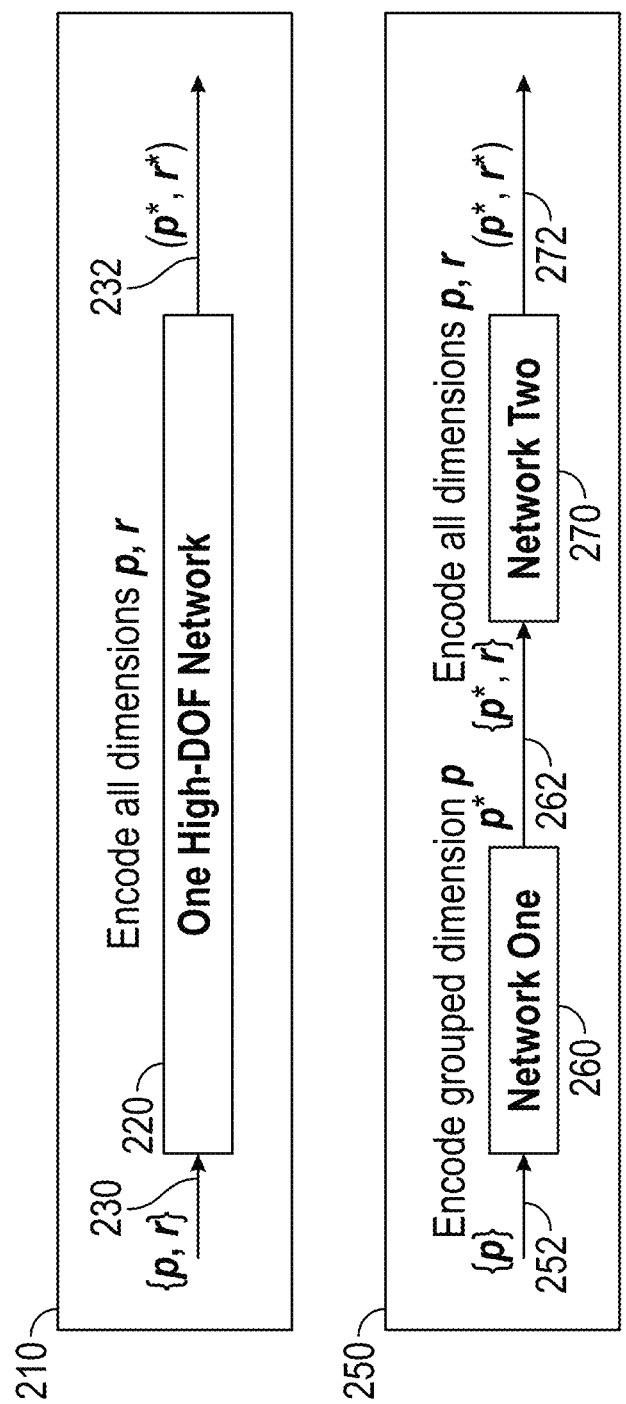
FIG. 2 is an illustration which contrasts prior art techniques for computing high-DOF robot tasks using a single large neural network with the techniques of the present disclosure in which the degrees of freedom are separated into decoupled neural networks.

FIG. 2 is an illustration which contrasts prior art techniques for computing high-DOF robot tasks using a single large neural network with the techniques of the present disclosure in which the degrees of freedom are separated into decoupled neural networks. In FIG. 2 and several later figures, the concept of dimensions evaluated by neural networks is described in terms of position dimensions p and rotation dimensions r. For example, ignoring gripper width, the position and orientation of a gripper on a robot can be fully described by three position degrees of freedom (x/y/z) (p) and three rotation degrees of freedom (yaw/pitch/roll, or two angles describing approach direction plus the rotation angle, or Euler or other suitable angles) (r).

In box 210 of FIG. 2, a traditional approach for using a neural network to compute a grasp is shown. A single neural network 220 is used to encode all six degrees of freedom, including three position dimensions p and three rotation dimensions r. In one example, the neural network 220 is trained using depth images of a pile of objects, along with a manually identified candidate of a quality grasp of a single object. In an execution phase (also known as deployment or inference phase, where the trained neural network is used to determine grasps in live robotic operations), input on line 230 are depth images containing environment data sufficient to infer the qualities of the full-DOF grasps including both gripper positions and rotations $\{p, r\}$. Output on line 232 are the dimensions of the proposed quality grasp of an individual object, including both the proposed optimal gripper positions and rotations $(p^*, r^*)$.

The neural network 220 in the box 210 encodes six dimensions of gripper pose defined by the input environment data associated with grasps $\{p, r\}$, and in execution phase attempts to search depth images to identify an optimum $(p^*, r^*)$ of all six dimensions. A neural network which encodes and searches this many dimensions becomes very complex (many layers), and as a result, the training and searching are very slow, and the search results may be imprecise or ambiguous.

In box 250 of FIG. 2, a new approach for using neural networks to compute a grasp is shown. Rather than using a single neural network to compute all dimensions of the grasp as in the traditional approach discussed above, two neural networks (260 and 270) are used. In the first neural network 260, using input environment data on line 252, the three position dimensions p are encoded such that the first neural network 260 can search for the position dimension value $p^*$ which yields the optimum grasp (maximum grasp quality metric) across all values of the three rotation dimensions r. In the second neural network 270, all position and rotation dimensions $\{p, r\}$ are encoded using the original input data from the line 252 plus the optimum position dimension value $p^*$ on line 262. However, during execution phase, the second neural network 270 is provided with the position value $p^*$ which yields the optimum grasp, and therefore the second neural network 270 only needs to search the rotation dimensions r. Output on line 272 are the dimensions of the proposed quality grasp of an individual object, including both the proposed optimal gripper positions and rotations $(p^*, r^*)$.

Another way to explain the above is as follows. The single neural network 220 searches for a high dimension robot action (predicts dimension values $r^*$, $$p^* = \underset{r,p}{\mathrm{argmax}}\, Q(r, p))$$

by searching across all dimensions $\{r, p\}$ for the values $\{r^*, p^*\}$ which maximize a quality metric Q which is a function of both r and p. According to the presently disclosed techniques, the single high dimension neural network 220 can be decomposed into a modularization of the two neural networks 260 and 270, where the first neural network 260 predicts a maximal margin value $$p^* = \underset{p}{\mathrm{argmax}}\, Q_r(p),$$

where $Q_r(p)$ is the grasp quality projected along the r direction, and the second neural network 270 predicts the conditional behavior $$r^* = \underset{r}{\arg\max} Q(r, p | p = p^*).$$

Following is a detailed discussion of how a high dimensional search problem can be modularized into two neural networks where each network has a reduced dimension search space but the combined networks still find an optimum grasp quality value.

Figure 3:
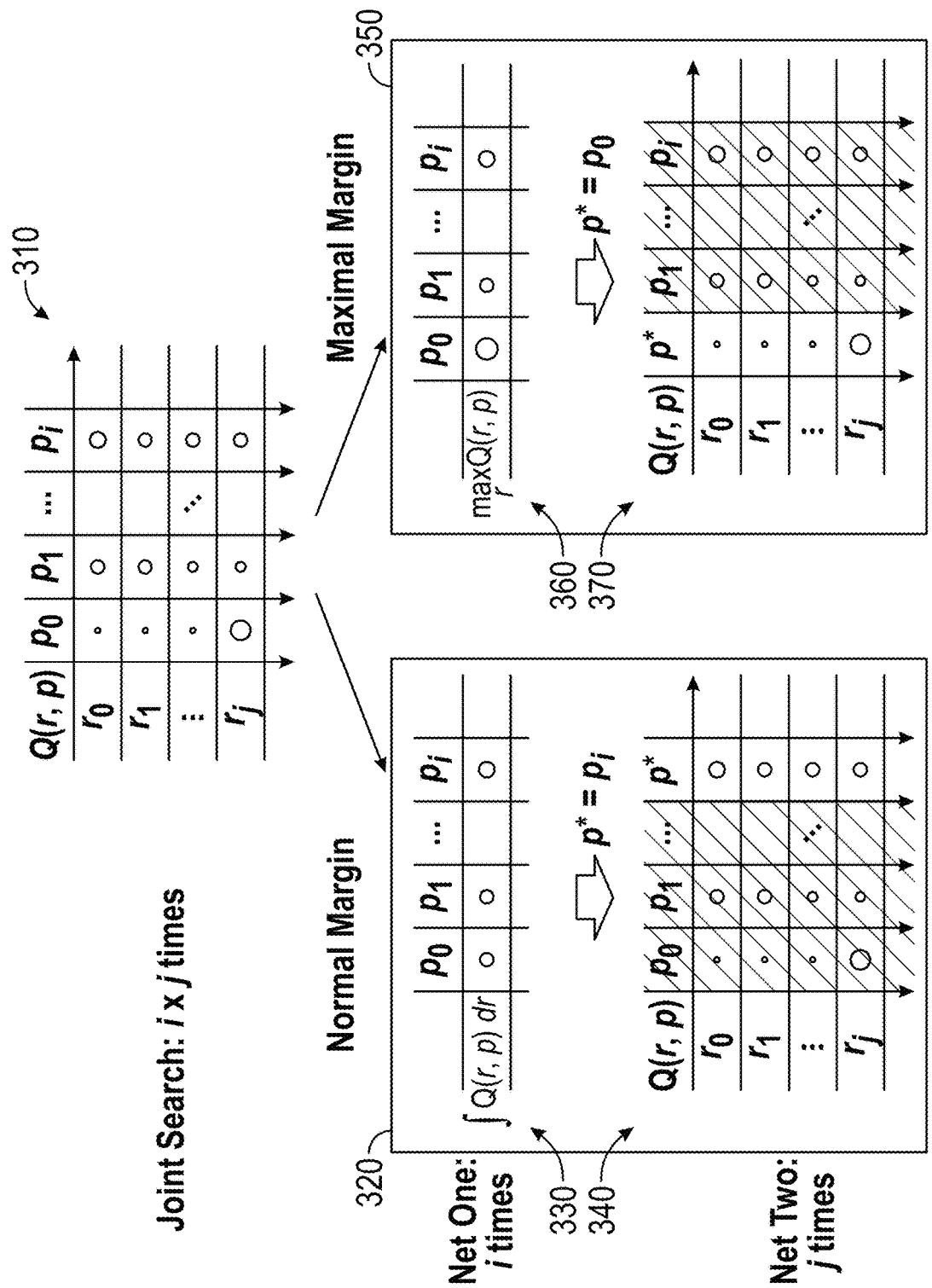
FIG. 3 is an illustration of a multi-dimensional search space showing how a maximal margin network modularization approach is used to decouple search dimensions and still find a maximum condition from the original search space, according to an embodiment of the present disclosure.

FIG. 3 is an illustration of a multi-dimensional search space showing how a maximal margin network modularization approach is used to decouple search dimensions and still find a maximum condition from the original search space, according to an embodiment of the present disclosure. A joint search space over dimensions p and r is represented by a grid 310. The grid 310 visually represents the search space, where columns designate values of p ($p_0, p_1, \ldots, p_i$) and rows designate values of r ($r_0, r_1, \ldots, r_j$). The size of the dot in each cell of the grid 310 represents the value of the grasp quality $Q(r,p)$ for that particular combination of p and r. A larger dot indicates a higher grasp quality.

As discussed earlier, when p and r represent position and rotation dimensions of a grasp (gripper pose), both p and r each include three dimensions or degrees of freedom. Thus, it can be easily envisioned that in order to find an optimal grasp candidate, many different values of p and r will have to be searched. That is, the values of i and j are likely to at least be in the hundreds. For example, if the x, y and z dimensions of p are each divided into ten increments, p will have a dimensional size of 10×10×10=1000. When searching of the grid 310 is performed by a single neural network (such as the network 220 of FIG. 2), the search must be performed i·j times (i multiplied by j). This results in a very large search space, and consequently a very complicated and slow neural network. When searching of the grid 310 is performed by two lower dimension neural network (such as the networks 260 and 270 of FIG. 2), the search must be performed i+j times, which is a much smaller number. This results in a much less complicated and faster neural network solution, and is discussed in detail below.

As also mentioned earlier, the present disclosure defines techniques for separating (modularizing) the one large, high dimension neural network into two (or more) simpler neural networks. A key to separating the one large neural network into two simpler neural networks is encoding the first neural network to find a value p* which yields the overall highest grasp quality at one of its corresponding values of r, so that the second neural network can then search the r dimension at an optimal location in p. Following is a discussion of this technique.

In box 320 is shown a first technique for neural network modularization, where the searching of both p and r dimensions of the grid 310 is separated into a search of the p dimension to find p*, followed by a search of the r dimension at p* to find the maximum quality grasp. As discussed above, p* can be found by $$p^* = \underset{p}{\arg\max} Q_r(p),$$

where $Q_r$ (p) is the grasp quality $Q(r,p)$ projected along the r direction. $Q_r(p)$ hides r and is a function of p only. The technique described in the box 320 defines $Q_r(p) = \int Q(r,p) dr$. When $Q_r(p)$ is defined in this way, the first neural network (shown at 330) finds the value of p* which has the best average quality Q, that is, the integral across all values of r. Based on the sizes of the quality dots in the grid 310, it can be seen that the value of p* in the box 320 is $p_i$, which is the column with the highest average quality.

When the second neural network in the box 320, shown at 340, searches across all values of r at $p^*=p_i$ to identify the maximum value of Q, all other values of p are hidden. Thus, the second neural network finds the maximum grasp quality for $p^*=p_i$, which occurs at $r_0$. A visual inspection of the grid 310 reveals that the grasp quality at $(r_0, p_i)$ is not the overall maximum grasp quality. Thus, the normal margin technique shown in the box 320 is not reliably able to find a maximum value when used in neural network modularization.

In box 350 is shown a second technique for neural network modularization, where the searching of both p and r dimensions of the grid 310 is separated into a search of the p dimension to find p*, followed by a search of the r dimension at p* to find the maximum quality grasp. According to the present disclosure, the technique described in the box 350 uses a maximal margin technique which defines $$Q_r(p) = \max_r Q(r, p).$$

When $Q_r(p)$ is defined in this way, the first neural network (shown at 360) finds the value of p* which has the best overall quality Q, that is, the maximum individual quality across all values of r. In other words, the first neural network predicts a particular p has high score as long as there exists one r that performs well. Based on the sizes of the quality dots in the grid 310, it can be seen that the value of p* in the box 350 is $p_0$, which is the column containing the cell with the highest individual quality.

When the second neural network in the box 350, shown at 370, searches across all values of r at $p^*=p_0$ to identify the maximum value of Q, all other values of p are hidden. Thus, the second neural network finds the maximum grasp quality for $p^*=p_0$, which occurs at $r_j$. A visual inspection of the grid 310 reveals that the grasp quality at $(r_j, p_0)$ is in fact the overall maximum grasp quality. Thus, the maximal margin technique shown in the box 350 is able to find a target value of one dimension (p*) which yields a maximum value when used in neural network modularization.

Because the second neural network 370 in the box 350 searches r only at $p^*=p_0$, and all other values of p are hidden, the search of the second neural network is much faster (by a factor of j) than a single neural network search across all dimensions of the grid 310. This huge improvement in neural network searching performance is very important in robotic grasping applications where the grasp proposal corresponding to an image of a pile of objects must be computed in real time to support robot control.

Based on the preceding discussion of FIG. 3, it can be seen that the maximal margin technique (shown in the box 350, where p* can be found by $$p^* = \underset{p}{\arg\max} Q_r(p), \text{ and } Q_r(p) = \max_r Q(r, p))$$

can be employed effectively for neural network modularization. Following is a discussion of how this is done in a training phase and in an inference phase of neural network modularization.

Figure 4:
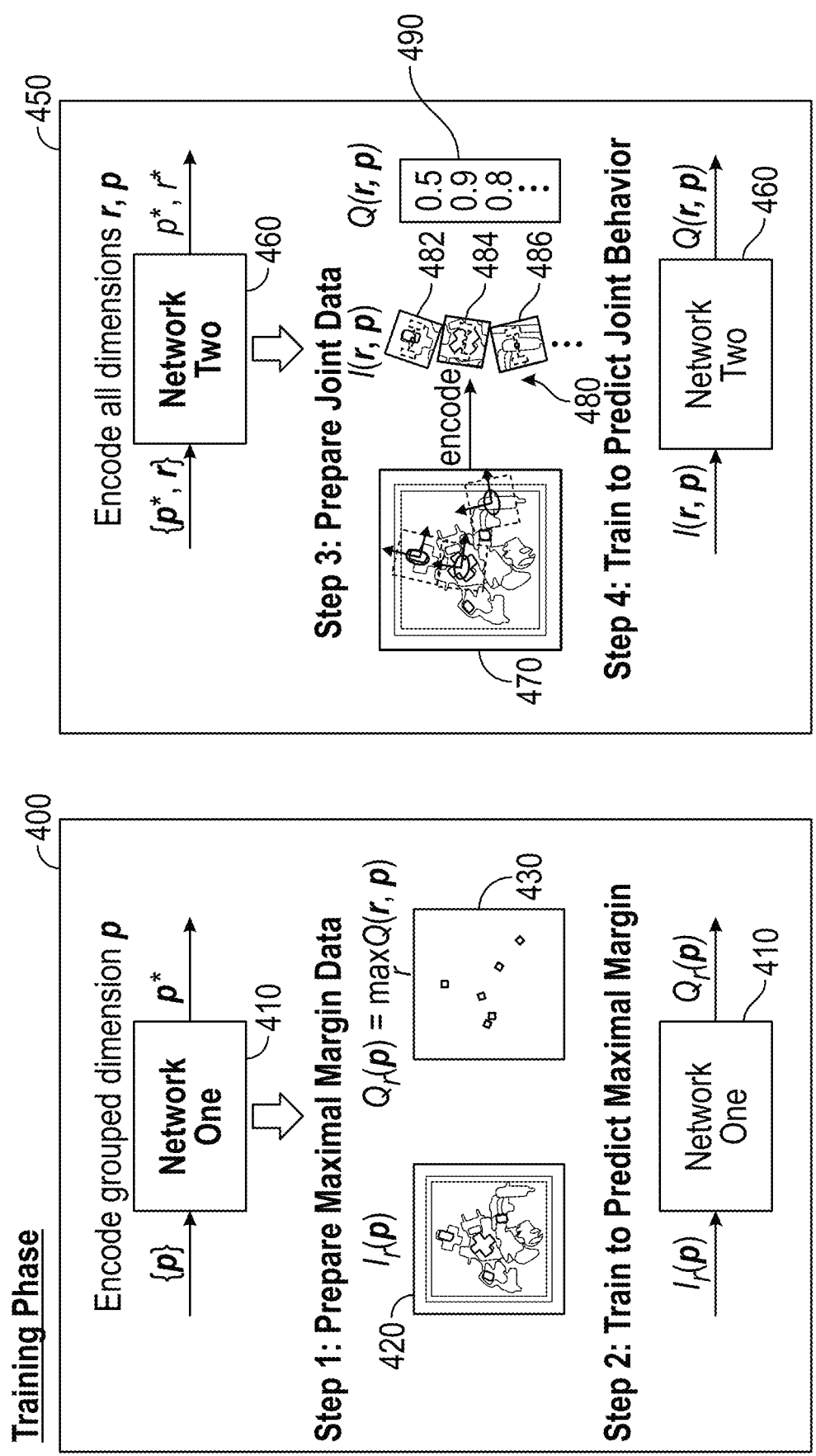
FIG. 4 is a block diagram illustration of steps in a training phase of a neural network modularization technique, according to an embodiment of the present disclosure.

FIG. 4 is a block diagram illustration of steps in a training phase of a neural network modularization technique, according to an embodiment of the present disclosure. Box 400 includes the steps used in training a first neural network 410. Box 450 includes the steps used in training a second neural network 460. The first (410) and second (460) neural networks of FIG. 4 operate in the manner of the first and second neural networks of FIG. 3 discussed above.

As shown schematically at the top of the boxes 400 and 450, the first neural network 410 encodes the grouped dimension p such that, based on input data which describes the environment for {p}, the first neural network is able to predict p*—the value of p for which there is a maximum quality at some value of r. The second neural network 460 then encodes all dimensions (p,r) based on input data which defines the environment for all r at the previously identified p*, and identifies values (p*,r*) where a maximum grasp quality exists.

Figure 5:
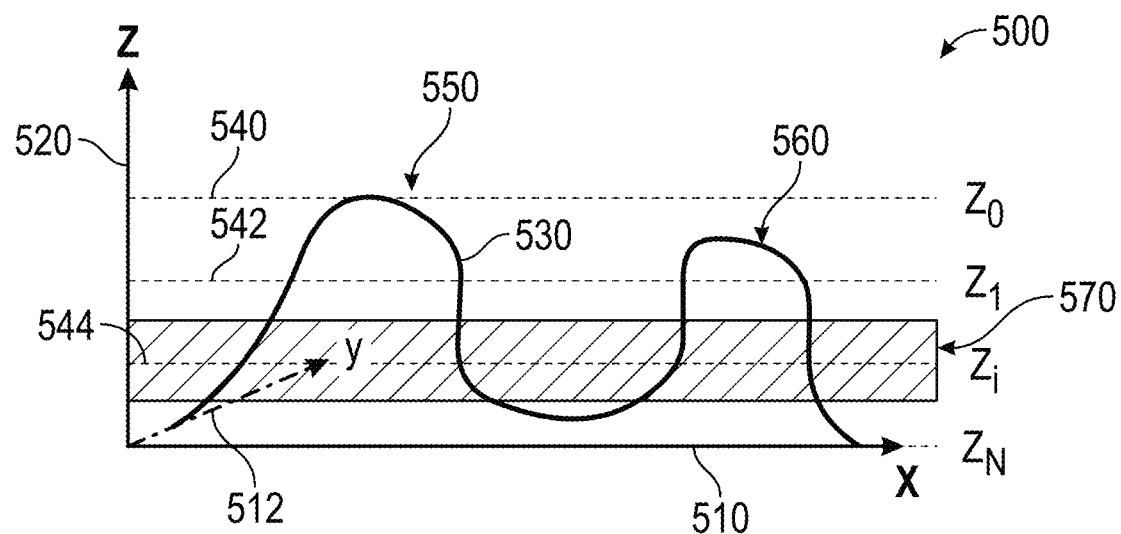
FIG. 5 is a graph illustrating how 3D depth image data is processed into a set of depth layers and provided in the training phase of FIG. 4, according to an embodiment of the present disclosure.
Figure 6:
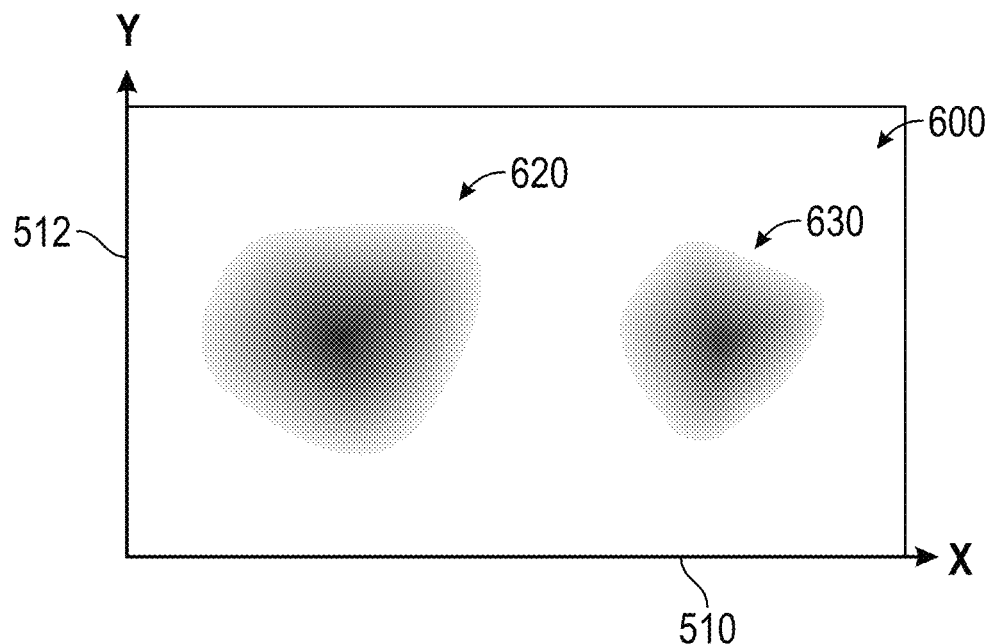
FIG. 6 is an illustration of a depth image layer for a particular depth layer of FIG. 5 and provided in the training phase of FIG. 4, according to an embodiment of the present disclosure.

To train the first neural network 410, maximal margin data is first prepared as indicated at 420 and 430. The input data $I_r(p)$ indicated at 420 represents the state to uniquely encode the action p. The action r is hidden so $I_r(p)$ is a function of p. The output data $Q_r(p)$ indicated at 430 is the quality Q(r,p) projected along r direction with maximal margin method (discussed above with respect to FIG. 3). The output data $Q_r(p)$ at 430 is provided in the form of grasp quality maps, discussed further below. $Q_r(p)$ hides r and is a function of p only. Although the quality is the output of the first neural network 410, the $Q_r(p)$ data is provided as input for network training. For a grasping task, $I_r(p)$ represents the information (e.g. depth) in different p, and $Q_r(p)$ is the maximal quality for different r in a particular p, as shown at 420 and 430. FIGS. 5 and 6 further illustrate the input data $I_r(p)$, the grasp quality data $Q_r(p)$, and the relationship between them which is ultimately encoded into the first neural network 410 through training.

FIG. 5 is a graph 500 illustrating how 3D depth image data is processed into a set of depth layers and provided in the training phase of FIG. 4, according to an embodiment of the present disclosure. For a particular 3D depth image (shown at 420 in FIG. 4), multiple depth image layers are provided as the input data $I_r(p)$ for training the first neural network 410. In the graph 500, an x-axis 510 represents one horizontal dimension of the 3D depth image, and a z-axis 520 represents the vertical dimension of the depth image (for example, the z-axis 520 could be the height of a bin full of parts). A y-axis 512 of the 3D depth image is "into the page" in the graph 500. A curve 530 depicts the collective height of the pile of parts in the x-z plane. In other words, the curve 530 is the top of a cross-section of the pile of parts in the x-z plane.

The 3D depth image can be divided into multiple layers, each at a different height $(z_0, z_1, \ldots, z_i, \ldots, z_N)$. The height $z_0$, represented by a line 540, indicates the highest point in the depth image (e.g., the pile of parts). One depth image layer is provided for the height $z_0$, which shows a complete depth map including all objects from the $z_0$ level (top of highest object) all the way down to the $z_N$ level (bottom of the bin). In the depth image layer for $z_0$, the z coordinates of the depth image have a reference origin set to $z_0$—such that everything in the depth image has a negative z coordinate. The height $z_1$, represented by a line 542, indicates a level slightly below the top of the depth image. Another depth image layer is provided for the height $z_1$, which again shows a depth map including all objects from the $z_0$ level down to the bottom $z_N$ level; however, in the $z_1$ depth image layer, the z coordinates of the depth image have a reference origin set to $z_1$—such that everything above $z_1$ in the depth image has a positive z coordinate, and everything below $z_1$ in the depth image has a negative z coordinate. Similarly, depth image layers are provided for additional levels $z_i$ (represented by a line 544). Each depth image layer is a complete depth image for the entire pile of parts, but each depth image layer has a different origin in the z direction. By slicing at different levels and providing multiple depth image layers, the z direction is encoded in training the neural network 410. The x and y encoding is naturally done by the two-dimensional information in each layer. This is shown in FIG. 6.

The curve 530 has a feature 550 and a feature 560. The features 550 and 560 are high spots in the depth map which indicate places where the pile of parts is higher due to the presence of one or more parts. The features 550 and 560 will be manifested in shapes in the depth image and in the grasp quality maps, as discussed below.

FIG. 6 is an illustration of a depth image layer 600 for a particular depth layer of FIG. 5 and provided in the training phase of FIG. 4, according to an embodiment of the present disclosure. In the depth image layer 600, the x-axis 510 corresponds with the x-axis 510 of FIG. 5, and the y-axis 512 corresponds with the y-axis 512 of FIG. 5. In other words, the depth image layer 600 is a top-down depth image, and the z-axis 520 of FIG. 5 is "coming out of the page" in FIG. 6.

The depth image layer 600 includes a shape 620 and a shape 630, which correspond to the features 550 and 560, respectively, of FIG. 5. The shapes 620 and 630 are darkest in the center, indicating the highest z coordinate and corresponding to the peaks of the features 550 and 560 of FIG. 5. If the depth image layer 600 is for the height $z_1$, then the z coordinates of the depth image have a reference origin set to $z_i$—such that everything above $z_i$ (the line 544) in the depth image has a positive z coordinate, and everything below $z_i$ (the line 544) in the depth image has a negative z coordinate. Similarly, the quality maps indicated at 430 of FIG. 4 are also stacked into layers or slices. Each layer of the quality maps 430 shows the grasp candidates that are close to the current layer of the depth image—such as within a shaded area 570 of the height $z_i$. For example, the quality map for the height $z_i$ would include quality grasps at the center of the shapes 620 and 630, whereas the quality map for the height $z_N$ would likely include no quality grasps because there is no graspable feature in the depth image at that level. The grasp candidates provided in the quality maps 430 may be manually generated by traditional methods such as heuristics, or may be automatically generated using gripper/object optimization calculations followed by a physical environment (pile of objects) simulation—which is discussed further below.

To summarize the maximal margin data preparation for training the first neural network 410 (in the box 400 of FIG. 4): for a particular pile of objects, point cloud or other depth map data (such as from 3D cameras) is used to provide the depth images 420 (at multiple layers) and corresponding quality maps 430 (designating grasp quality at various points on each depth image layer). The aforementioned steps are performed for many different piles of objects (preferably thousands). After the maximal margin data is prepared as indicated at 420 and 430 of FIG. 4 and further detailed in FIGS. 5-6, the first neural network 410 is trained. The training step is shown at the bottom of the box 400, where the first neural network 410 is trained to predict grasp quality $Q_r(p)$ based on environment image data input $I_r(p)$. Training of the first neural network is straightforward and fast once the data is prepared. Because the grasp quality (the output of the first neural network 410) is provided as training data, the training shown in the box 400 is known as supervised learning.

To train the second neural network 460 (FIG. 4), data is prepared for encoding all dimensions r and p. First, the depth images 420 (at multiple layers) used to train the first neural network 410, along with the corresponding quality maps 430 (designating grasp quality and position at each depth image layer) are combined as shown at 470. Each of the depth images 420 is encoded with positions of quality grasps associated with a particular depth image layer. The result is input data I(r,p) shown at 480, which includes a plurality of depth image crops (482, 484, 486, . . . ) where each is a portion of one of the depth images 420 cropped and rotated as defined by the quality maps 430.

For grasping applications, in the input data I(r,p) shown at 480 (the depth image crops 482, 484, 486, . . . ), p is encoded by crop centers (x and y from the location on a depth image layer, and z from the depth origin of that layer), and r is encoded by crop angles, both as determined from the quality maps 430. It is often advantageous to allow non-vertical grasp directions in order to provide the best bin picking capability. The approach direction of a grasp (that is, a non-vertical approach direction) may be encoded in the first and second neural networks (410/460) by feeding depth images 420 (used again at 470) of different view angles. The depth images of different view angles may be computed from point cloud data obtained from two 3D cameras having different positions and orientations, as shown in FIG. 1.

Output data Q(r,p) is shown at 490, which includes a quality metric value associated with each of the depth image crops 482/484/486. The quality metric is also provided by the external training data source (discussed further below with respect to FIG. 10) for each grasp on the quality maps 430. Thus, the output data Q(r,p) is available as training data for the second neural network 460. For grasping, the output data Q(r,p) is a scalar value to represent the quality associated with the grasp action r and p. Although the second neural network 460 encodes all the action dimensions r and p, it only needs to search on r direction at inference time because of the p dimension encoding performed by the first neural network 410. After the joint (r and p) input and output data is prepared as indicated at 480 and 490 of FIG. 4, the second neural network 460 is trained. The training step is shown at the bottom of the box 450, where the second neural network 460 is trained to predict grasp quality Q(r,p) based on environment image data input I(r,p).

The first neural network 410 may be a fully convolutional network (FCN)—which is best suited for "image-in/image-out" applications. The second neural network 460 may be a convolutional neural network (CNN)—which is best suited for "image-in/scalar-out" applications, where high accuracy is possible due to the low dimensional content of the output. Both the first neural network 410 and the second neural network 460 are trained using supervised learning, which means that the desired output data from the networks (the quality maps 430 from the first neural network 410, and the grasp quality metrics 490 from the second neural network 460) are provided as inputs for training. Following the training steps illustrated in the boxes 400 and 450 of FIG. 4 and discussed above, the neural networks 410 and 460 are trained and ready for use in live robotic operations of the type shown in FIG. 1.

Figure 7:
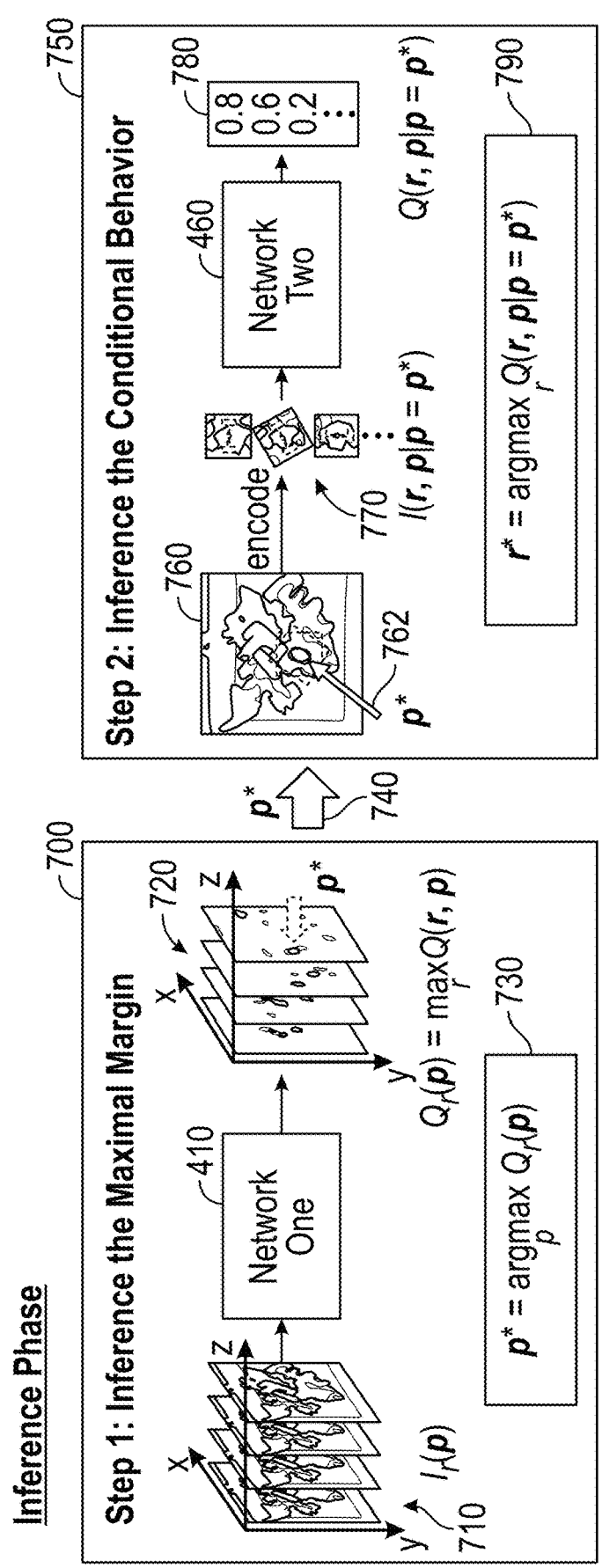
FIG. 7 is a block diagram illustration of steps in an inference phase of a neural network modularization technique, according to an embodiment of the present disclosure.

FIG. 7 is a block diagram illustration of steps in an inference phase of a neural network modularization technique, according to an embodiment of the present disclosure. In the inference phase—which may also be known as the deployment or execution phase—the neural networks 410 and 460 are used in live robotic part picking operations to analyze 3D depth images and provide quality grasp candidate recommendations. It is emphasized again here that robotic part picking (grasp determination from 3D depth images) is merely one example of neural network modularization to separate a high dimension task into two or more lower dimension networks.

The neural networks 410 and 460, shown in FIG. 4 and trained as discussed above, are used in the inference phase shown in FIG. 7. While the neural networks 410 and 460 are trained independently, they are connected at inference time to locate the full-dimensional action. There are several steps to run the networks in the inference phase; a box 700 includes steps involving the first neural network 410, while a box 750 includes steps involving the second neural network 460.

In the box 700, the first step is preparing the input data $I_r(p)$ that encodes p. In grasping applications, $I_r(p)$ can be depth images associated with different p. Depending on encoding methods and network structure, there can be different input/output types. In the grasping example shown, multiple depth image layers are provided at 710 for depth encoding and a fully convolutional network structure is used. Therefore, the inputs are depth images (horizontal slices, encoding p in x and y) centered in different heights or layers (encoding p in z), as discussed previously with respect to FIGS. 4-6.

When the inputs $I_r(p)$ (710) are provided, the neural network 410 can be run in a "forward loop" in inference mode as shown in the box 700. The output from running the first neural network 410 in inference mode is multiple quality maps (one at each layer in z—as shown at 720) where each pixel shows the maximal margin quality $$\left(Q_r(p) = \max_r Q(r, p)\right)$$

if grasping with associated p as discussed previously. Pixels in each quality map layer which have a grasp quality above a threshold are highlighted as dots or spots; all other pixels do not represent a quality grasp. Finally, the ultimate output from the first neural network 410 is the maximal margin value of p, obtained as shown in the equation at 730 from $$p^* = \arg\max_p Q_r(p).$$

The maximal margin value p* is provided to the second neural network 460 as shown by arrow 740.

The box 750 includes the steps involving the second neural network 460. This begins by preparing the data for the second neural network 460. The value of p*, provided from the first neural network 410 at the arrow 740, is applied to a particular depth image layer 760 as shown at arrow 762. By identifying a particular crop location (x and y) on a particular depth image layer (z), the value of p* is fully defined as input to the second neural network 460. The r space can then be searched by providing a plurality of rotated cropped image patches as shown at 770. Thus, the input to the second neural network 460 is I(r,p|p=p*). It is important to remember that during the inference phase, the second neural network 460 only searches in r space, as p space (the value p*) is already encoded from the first neural network 410.

The output of the second neural network 460 is the quality (scalar value) of each different r, as shown at 780. Thus, the output of the second neural network 460 is Q(r,p|p=p*). That is, a quality value (grasp quality in the example shown) is computed for each of the rotated cropped image patches 770. Finally, the ultimate output from the second neural network 460 is value of r having the greatest value of Q, obtained as shown by the equation in box 790 as $$r^* = \underset{r}{\arg\max} Q(r, p|p = p^*).$$

The value p* from the first neural network 410 is concatenated with the value r* from the second neural network 460 to provide the full action (r*,p*)— which in the grasping example shown is a full six-DOF robot grasp of an object, where the grasp has the high quality Q which was found as described above.

To explain once again what was done by the modularized neural networks 410 and 460 as shown in FIG. 7 and discussed above: using the input data shown at 710, the first neural network 410 found the maximal margin value p*, which is the value of the position dimension p having an individual grasp quality which is the highest in the entire search space; then using the value p* as input, the second neural network 460 found the value r*, which is the value of the rotation dimension r having the maximum grasp quality when the position dimension is constrained to p*. The concatenated dimensions (r*,p*) define a full six-DOF robot grasp of an object. Separation of the neural networks as disclosed allows the searching of the p space to be decoupled from the searching of the r space, thus resulting in a dramatic reduction in search space size (the sum of the dimension sizes i and j, rather than the product).

The preceding discussion and the examples shown in FIGS. 4-7 were described in terms of the example application of finding a high quality full-DOF grasp of an object for robotic part picking operations. As mentioned earlier, this is merely one example application for the disclosed network modularization techniques. The techniques can be applied generally to modularize any high dimension neural network into two or more lower input dimension networks which run much faster. Some specific grasping applications are discussed further below.

Figure 8:
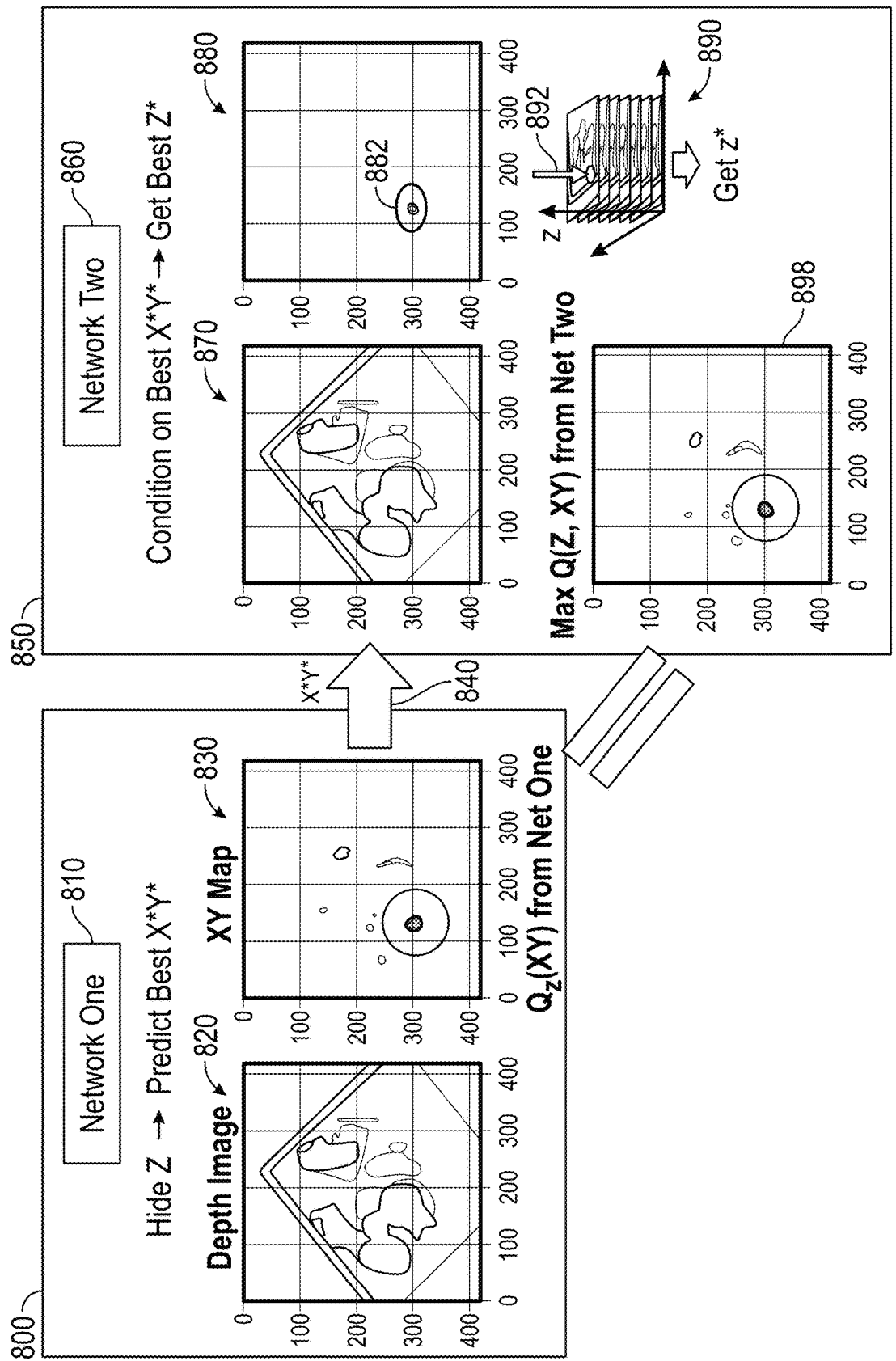
FIG. 8 is a block diagram illustration of the neural network modularization technique applied to a 3-DOF grasp searching problem, according to an embodiment of the present disclosure.

FIG. 8 is a block diagram illustration of the disclosed neural network modularization technique applied to a 3-DOF grasp searching problem, according to an embodiment of the present disclosure. In the example shown in FIG. 8, a relatively simple 3-DOF grasp is to be identified from a 3D depth image of a pile of objects. The three degrees of freedom to be computed are the x, y and z positions of the grasp point. No rotations are computed in this example. Rather than compute the three degrees of freedom in a single network, the computation can be modularized into two neural networks—where the first neural network computes x and y coordinates of a best quality grasp, and the second neural network computes the z coordinate.

A box 800 includes a first neural network 810 and its associated input and output data. A depth image 820, such as from one or more 3D cameras, is provided as input. In the training phase, a corresponding best quality grasp location is also provided for supervised learning. Through training using many of the depth images 820, the first neural network 810 learns to encode x and y from features of the depth image 820 to correspond to a best grasp quality. In the inference phase, the depth image 820 is provided to the first neural network 810, and the output is a single quality map 830 indicating a best quality grasp location in x and y dimensions. That is, the first neural network 810 encodes the maximal margin of $Q_z(xy)$. The first neural network 810 provides the x-y dimensions of the best grasp location (x*y*) to the second neural network 860 in the inference phase, as indicated at arrow 840.

A box 850 includes a second neural network 860 and its associated input and output data. The function of the second neural network 860 is to encode the z dimension. From a depth image 870 (which is the same as the depth image 820) and the input (x*y*) (which came from the first neural network 810 on the arrow 840), a depth image patch may be cropped at the best x and y position (x*y*) as shown in box 880 at 882. Another way to think of it is that, in the inference phase, the depth image 870 is cut into slices in the z direction as shown at 890, and the slices are evaluated at the best (x*y*) grasp location (shown at arrow 892) to determine the height z* at which a best quality grasp is found. Shown at 898 is one of the slices from the stack shown at 890, with a best grasp location circled, where the best grasp location in the slice 898 corresponds to the best grasp location in the quality map 830 from the first neural network 810 (which had not yet evaluated the z direction). It can thus be seen that final three-dimensional grasp quality from the second neural network 860

$$\left(\max_z Q(z, xy)\right)$$

in the slice 898 agrees in the x and y directions with the maximum two-dimensional grasp quality ($Q_z(xy)$) from the first neural network 810 in the quality map 830.

The final output grasp location (x*y*z*) includes the best x and y dimensions identified by the first neural network 810, and the best z dimension identified by the second neural network 860. The final output grasp location (x*y*z*) is provided to a robot controller which then provides commands to the robot to grasp the part at the identified coordinates. After the part is grasped, a new depth image would be provided to the neural networks 810 and 860, and coordinates of a new best grasp location computed.

By modularizing the 3-DOF grasp search into two networks—one network searching two dimensions, and another network searching one dimension—the overall search performance is improved. For example, consider a case where the x and y dimensions are each divided into a fairly coarse 20×20 grid, and the z dimension is divided into 10 layers. Using the disclosed network modularization techniques, the first neural network 810 searches a space of size 20×20=400, and the second neural network 860 searches a space of size 10; the resulting modularized search space has a size of 400+10=410. If all three dimensions were searched in a single network, that network would have a search space with a size of 20×20×10=4000.

Figure 9:
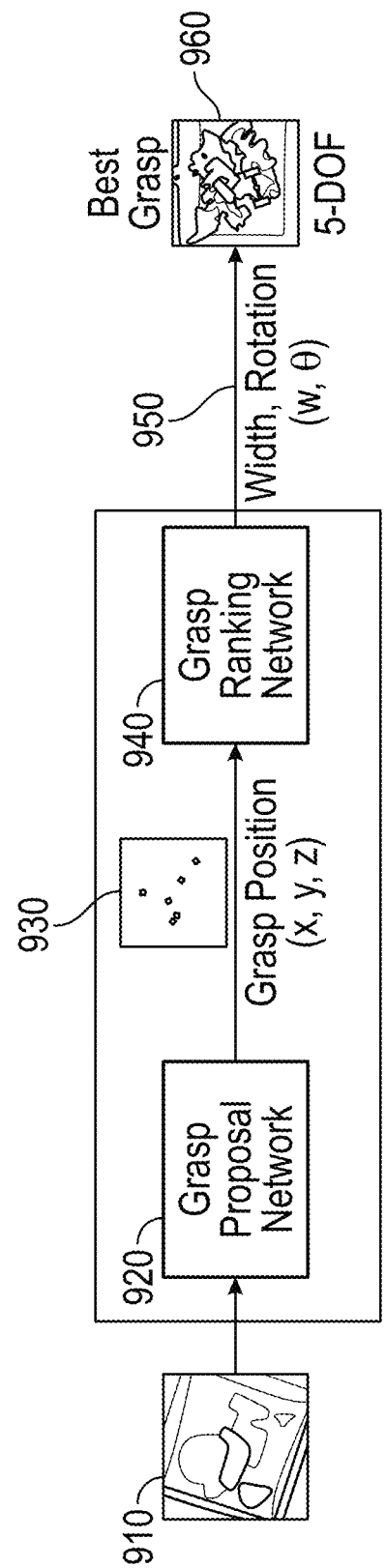
FIG. 9 is a block diagram illustration of the neural network modularization technique applied to a 5-DOF grasp searching problem, using two neural networks, according to an embodiment of the present disclosure.

FIG. 9 is a block diagram illustration of the neural network modularization technique applied to a 5-DOF grasp searching problem, using two neural networks, according to an embodiment of the present disclosure. In the example shown in FIG. 9, a 5-DOF grasp is to be identified from a 3D depth image of a pile of objects. The five degrees of freedom to be computed include the x, y and z positions of the grasp point, along with a gripper width and a gripper rotation angle. In this example, no approach angle is computed; a top-down vertical approach is assumed. Rather than compute the five degrees of freedom in a single network, the computation can be modularized into two neural networks using the disclosed methods—where the first neural network computes the x/y/z coordinates of a best quality grasp, and the second neural network computes the gripper width (w) and the gripper rotation angle ($\theta$) along with the final grasp quality which is maximized.

A 3D depth image 910 (depicting a pile of objects in a bin, for example) is provided to a grasp proposal network 920. The grasp proposal network 920 is a fully convolutional network (FCN)—as it receives an image as input (the depth image 910) and provides an image as output (a grasp quality map 930). The grasp quality map 930 is provided to a grasp ranking network 940—which is a convolutional neural network (CNN), as it receives an image in and provides scalar data out (gripper width and rotation). The gripper width and rotation (shown at 950) from the grasp ranking network 940 are combined with the best grasp position (x/y/z) from the grasp quality map 930 produced by the grasp proposal network 920; together, this provides a 5-DOF grasp definition (x/y/z/w/$\theta$) to be used by a robot controller.

As discussed in detail previously, the grasp proposal network 920 and the grasp ranking network 940 are first trained using supervised learning, and then operated in inference mode. In training, the grasp proposal network 920 is provided with depth images and corresponding grasp quality maps. The grasp ranking network 940 is trained by providing the depth image and corresponding quality maps as provided to the grasp proposal network 920, along with the desired outputs of gripper width/rotation and the final grasp quality. An automated method for performing this training is discussed further below with respect to FIG. 10.

In inference mode, the grasp proposal network 920 is provided with depth images only (and provides a quality map as output), while the grasp ranking network 940 is provided with the depth image and corresponding quality map as input (and provides outputs of gripper width/rotation and the final grasp quality associated with the location of the best quality grasp chosen from the quality map).

By modularizing the 5-DOF grasp search of FIG. 9 into two networks—one network searching three dimensions, and another network searching two dimensions—the overall search performance is improved. For example, consider a case where the x and y dimensions are each divided into a fairly coarse 20×20 grid, and the z dimension is divided into 10 layers, while the gripper width has 10 positions and gripper angle has 20 positions. Using the disclosed network modularization techniques, the first neural network 920 searches a space of size 20×20×10=4000, and the second neural network 940 searches a space of size 10×20=200; the resulting modularized search space has a size of 4000+200=4200. If all five dimensions were searched in a single network, that network would have a much larger search space with a size of 4000×200=800000.

Figure 10:
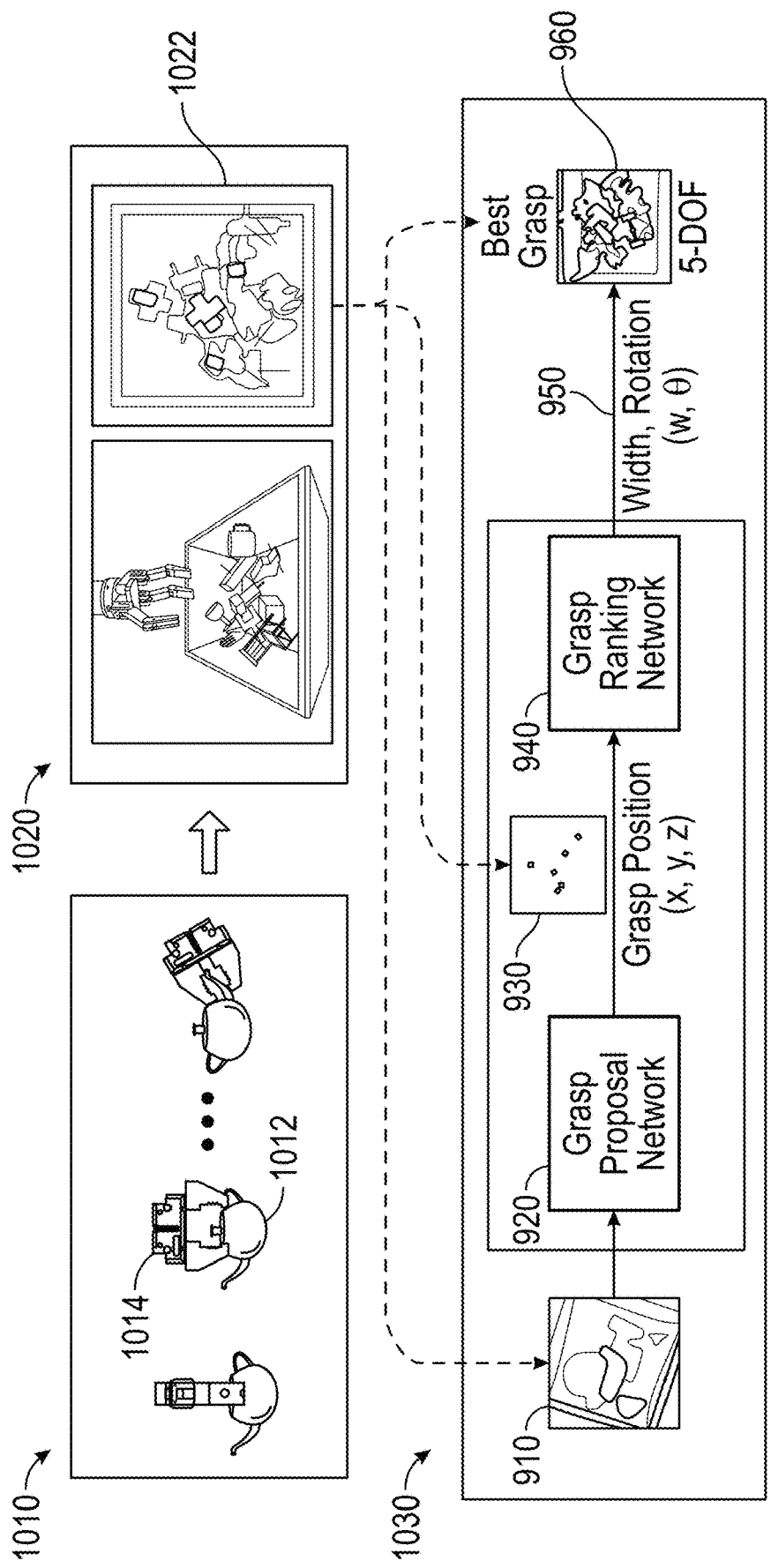
FIG. 10 is an illustration of a method for training a modularized grasp learning network of the type shown in FIG. 9 using a combination of individual object grasp optimization and clustered object variation and interference simulation, according to an embodiment of the present disclosure.

FIG. 10 is an illustration of a method for training a modularized grasp learning network of the type shown in FIG. 9 using a combination of individual object grasp optimization and clustered object variation and interference simulation, according to an embodiment of the present disclosure. The training method steps shown in FIG. 10 may be performed in an "off-line" environment, using a computer other than the robot controller which is later used to control robot motion, and provide a very efficient means of producing grasp data for training the neural networks 920 and 940 of FIG. 9.

In a first data preparation step at box 1010, automatic grasp searching on individual objects in a database is shown. Multiple grasps of an object 1012 by a gripper 1014 are illustrated. 3D solid or surface models of parts to be analyzed are provided, along with gripper data including geometry and operational parameters (finger joint locations, joint angle ranges, etc.). An iterative optimization method is used to produce robust grasp candidates based on part shape and gripper parameters. The step shown in the box 1010 provides a plurality of quality grasp positions and orientations for an individual part (the object 1012) by a particular gripper (the gripper 1014). These grasp poses can be computed automatically for many different objects using many different grippers.

In a second data preparation step at box 1020, robust grip simulation is performed, taking variation and interference into consideration. At this step, objects are further randomly sampled into dense clusters by simulating a stream of the objects tumbling into a bin and randomly settling in a pile of objects having various positions, orientations and entanglements. The pose of each object in the simulated pile is known, so the previously generated grasps (from the box 1010) can be tested to determine their effectiveness in simulated real-world conditions (entanglements and interferences). The success of each previously generated grasp is tested in this way, using a 3D depth image of the simulated pile of objects along with the previously generated grasps. The step shown at the box 1020 is a physical environment simulation which is performed entirely using mathematical simulations, not using actual parts and images. The simulated depth image, grasp location quality maps, grasp poses, and the success rates (collectively shown at box 1022) are stored and later used to train the grasp learning networks of FIG. 9—which are shown below in FIG. 10.

The grasp optimizations and simulations described above and depicted in the boxes 1010 and 1020 were disclosed in U.S. patent application Ser. No. 17/016,731, titled EFFICIENT DATA GENERATION FOR GRASP LEARNING WITH GENERAL GRIPPERS, filed 10 Sep. 2020 and commonly assigned with the present application, and hereby incorporated by reference in its entirety.

The grasp learning networks of FIG. 9 are shown in a box 1030 in FIG. 10. Following is a discussion of how the automatically generated grasp data is used to train the modularized neural networks, including separately training the grasp proposal network 920 and the grasp ranking network 940 using the data from the box 1022.

The training of the grasp proposal network 920 requires the depth image 910 as input. The depth image 910 can be provided from the box 1022, where the depth image 910 depicts the pile of objects from the physical environment simulation. For supervised learning, the training of the grasp proposal network 920 also requires the grasp quality map 930 depicting the quality of grasps at different pixel locations. The quality map 930 is also provided from the box 1022, where quality maps were computed from the physical environment simulation. The physical environment simulation shown in the box 1020 can be performed many times (thousands of times), with each random simulation providing a different random pile of objects, resulting in an ample quantity and diversity of the depth images 910 and corresponding quality maps 930 to train the grasp proposal network 920.

Next, the grasp ranking network 940 is trained. This network uses depth image crops at different angles (prepared from the quality map 930) as input, and outputs the gripper rotation angle (θ) and gripper width (w) as shown on the line 950, along with the corresponding grasp quality, also using the simulation results from the box 1022 as a basis for training (supervised learning). With the gripper rotation angle and gripper width included, the output at the box 960 now includes five grasping degrees of freedom. Stating again to be clear—the grasp optimization method of the box 1010 produces many different grasps for an object using a particular gripper; the physical environment simulation method of the box 1020 produces grasp quality simulation results for different grasp poses applied to randomly generated piles of objects; and the outputs of the physical environment simulation are used to train the grasp proposal network 920 and the grasp ranking network 940.

Following the training of the two neural networks (920, 940) as shown in FIG. 10, actual execution of the robot grasping system can be carried out using the trained neural networks (920, 940) to determine a grasp based on depth image input and then control the robot; this was discussed earlier with respect to FIG. 9. The data generation steps shown in the boxes 1010 and 1020 can be applied not only to the 5-DOF grasping system/method of FIG. 9, but to modularized grasping networks of lesser (e.g., 3-DOF) or greater (e.g., 7-DOF) complexity.

Figure 11:
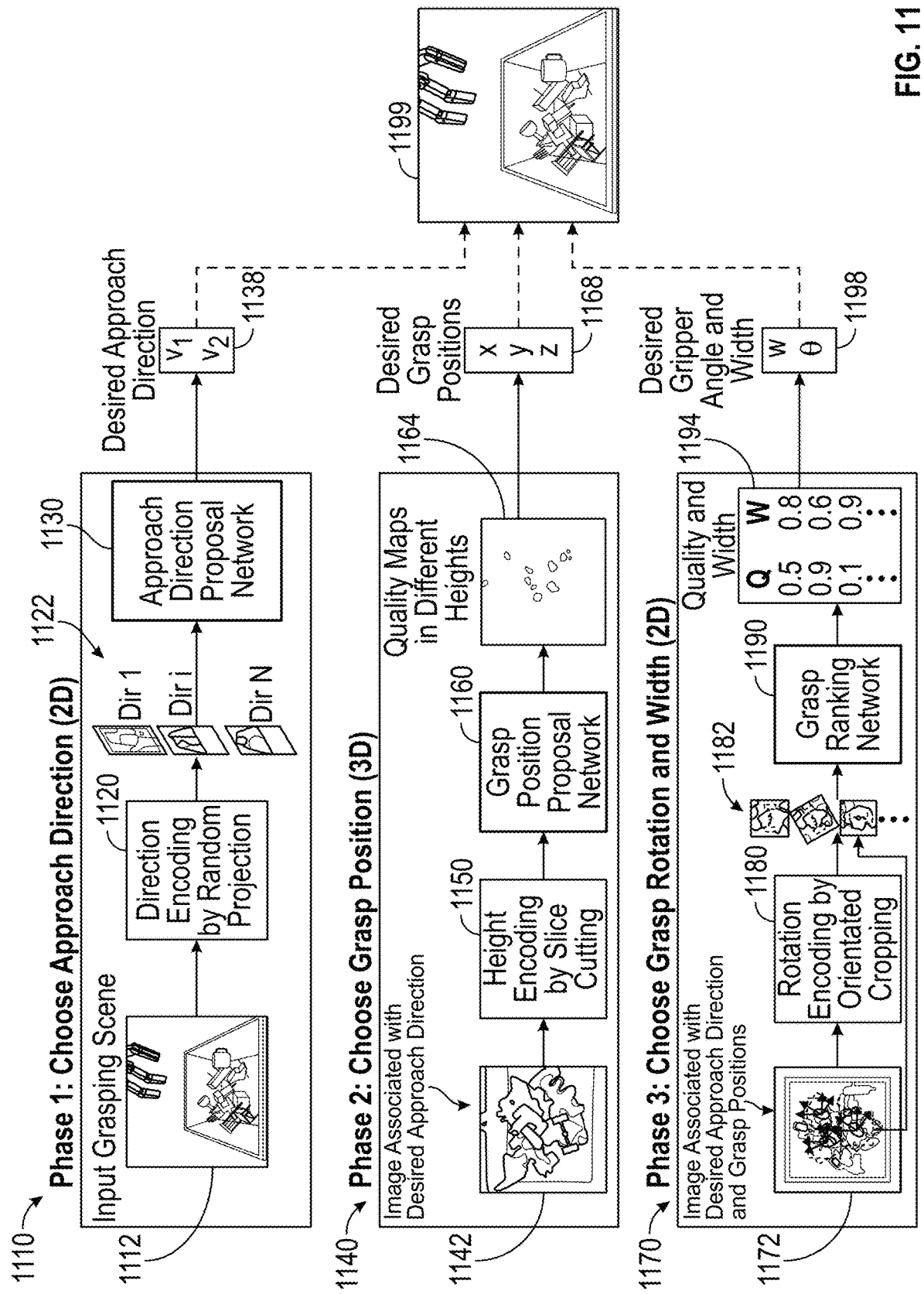
FIG. 11 is a block diagram illustration of the neural network modularization technique applied to a 7-DOF grasp searching problem, using three neural networks, according to an embodiment of the present disclosure.

FIG. 11 is a block diagram illustration of the neural network modularization technique applied to a 7-DOF grasp searching problem, using three neural networks, according to an embodiment of the present disclosure. In the system of FIG. 11, the seven grasping degrees of freedom include approach direction selection (2 DOF), grasp position selection (3 DOF) and gripper orientation and width selection (2 DOF). As in the earlier discussion of 3-DOF and 5-DOF neural network systems, the neural networks shown in FIG. 11 are first trained, and then used in inference mode to perform grasp computations during actual part grasping operations by a robot, such as shown in FIG. 1.

In box 1110 are the steps in a first phase of the method; choosing the best approach direction. Given an input scene 1112, which for example may be images from a pair of 3D cameras of parts in a bin, the associated point cloud is projected to multiple sampled approach directions by a direction encoding box 1120 to produce synthetic images 1122. The images of the input scene 1112 include depth information, allowing the algorithm in the direction encoding box 1120 to produce synthetic surface images as viewed from a plurality of randomly selected projection points of view. In other words, if the robot gripper approaches from a certain direction, what will the 3D surface image look like from that direction? These synthetic images are created for many different randomly sampled projection angles and provided in the synthetic images 1122, where the projection angles are within directional limits from which the robot may approach.

An approach direction proposal network 1130 is used to predict the overall quality if grasping from each approach direction proposed in the synthetic images 1122. In other words, in the network 1130, the grasp is hidden, and the approach direction containing a best grasp quality is determined using the maximal margin technique discussed earlier. The approach direction is defined as two vectors, $v_1$ and $v_2$, which may be azimuth and elevation angles in a polar coordinate system, or any other components which define a three-dimensional approach direction vector. The chosen approach direction ($v_1$, $v_2$) is stored as approach direction vector 1138, and will be used later by the robot controller. The depth image associated with the optimal approach direction is also saved and used in the next phase.

In box 1140 are the steps in a second phase of the method; deciding the best grasp position. A depth image 1142 is provided, which is the synthetic depth image (from the set of images 1122) associated with the optimal approach direction 1138 chosen above. The depth image 1142 is cut into slices at different heights at slice cutting box 1150, and sent to grasp position proposal network 1160. The grasp position proposal network 1160 generates quality maps for image slices of different heights as shown at 1164, and as discussed earlier relative to FIG. 4. In other words, the network 1160 hides gripper width and angle, and encodes grasp quality as a function of position, given the defined approach angle. The quality maps 1164 indicate the quality of a grasp which will result from choosing a particular point (x,y,z), given the approach direction 1138. The 3D coordinates of the top-quality grasp position are stored at 1168 and provided as input for the following block, and also will be used later by the robot controller.

In box 1170 are the steps in a third and final phase of the method; deciding the grasp angle (θ) and width (w). A depth image 1172 is provided, which is the depth image associated with the desired approach direction 1138 ($v_1$, $v_2$) and the desired grasp position 1168 (x,y,z) selected above. At box 1180, image patches are cropped at different angles around the top-quality grasp position stored at 1168. These image patches (1182) are sent to a grasp ranking network 1190 to output the qualities and widths (1194) for each evaluated image patch and angle. The grasp angle (θ) and width (w) corresponding to the highest quality is selected and stored at 1198.

The desired approach direction (2 DOF—$v_1$, $v_2$) stored at 1138, the best grasp position (3 DOF—x, y, z) stored at 1168 and the best grasp width/angle (2 DOF—w,θ) stored at 1198 are sent to the robot controller for execution, as indicated at 1199. That is, the robot controller instructs the robot to grasp a part from the bin using robot motion commands computed from the approach direction, grasp position and grasp width/angle information. The robot then places the part in a prescribed location (such as on a conveyor, or in a shipping container). The method then returns to the box 1110 where a new image for a new input scene 1112 is provided, and the grasp selection steps and robot execution are repeated.

The use of three neural networks for a 7-DOF grasp search application as shown in FIG. 11 provides numerous advantages. The approach direction proposal network 1130 enables grasp dexterity by eliminating the constraint of top-down vertical grasps. The grasp position proposal network 1160 provides fast computation of the three grasp position degrees of freedom by computing these dimensions separately from the other degrees of freedom. The grasp ranking network 1190 provides the accuracy inherent in the scalar output of a convolutional neural network. Furthermore, the use of three neural networks for 7-DOF grasp searching instead of one large neural network reduces the search space size by several orders of magnitude, with a corresponding improvement in search speed. In addition, the system shown in FIG. 11 is designed to take advantage of the strengths of different types of neural networks—using fully convolutional networks (FCNs) for neural networks 1130 and 1160 which take images as input and provide images as output, and using a convolutional neural network (CNN) for the neural network 1190 which receives image input and provides scalar data output.

The examples discussed above with respect to FIGS. 8-11 (3-DOF, 5-DOF and 7-DOF grasping) illustrate the capability and flexibility offered by the disclosed neural network modularization technique in different grasping applications. It is again emphasized that the disclosed neural network modularization technique can be used in other applications besides grasping—any application where neural network encoding and computation of a high dimensional task is required.

Figure 12:
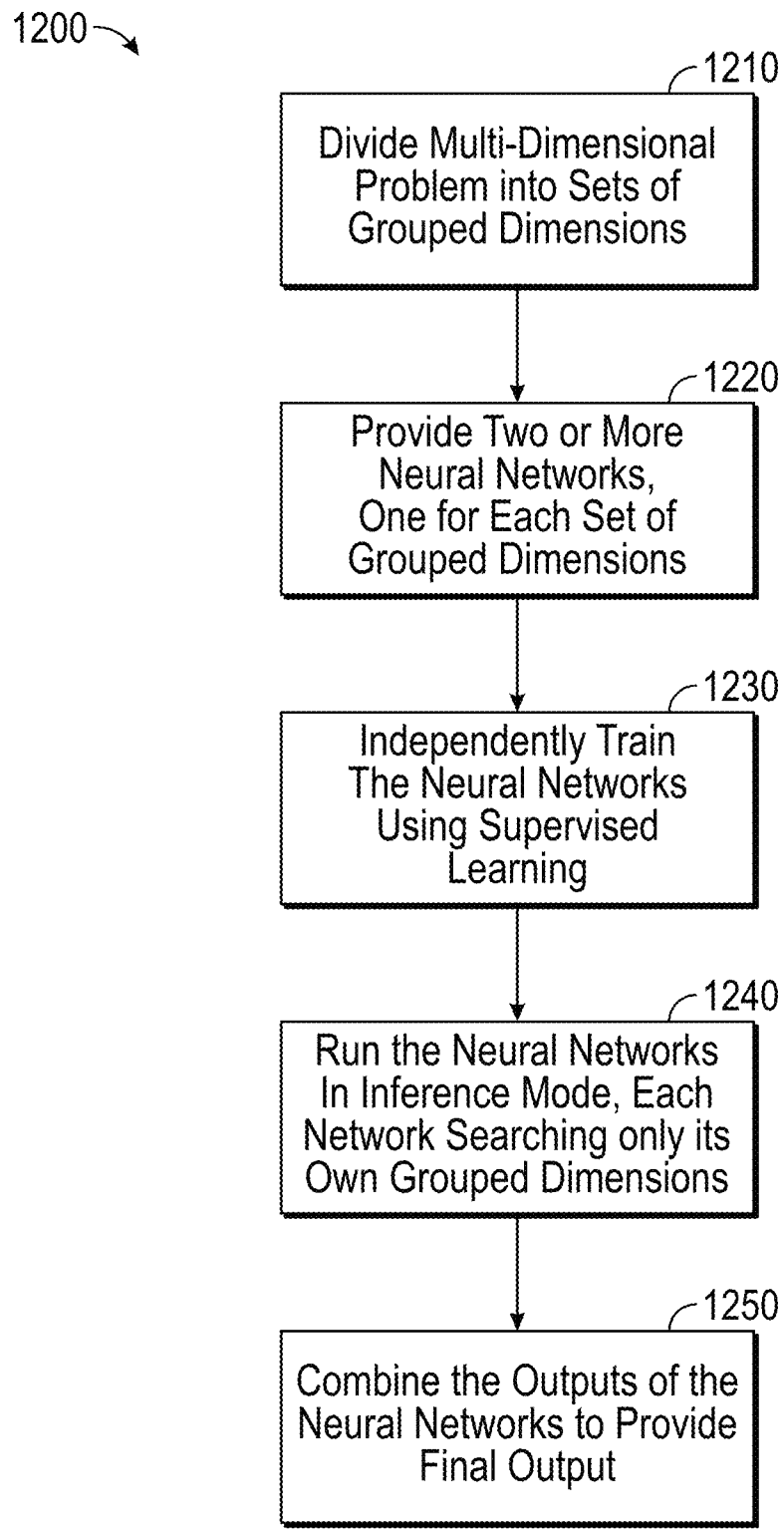
FIG. 12 is a flowchart diagram of a method for modularizing a high dimensional robot task into two or more neural networks of lower dimensions connected in series, according to an embodiment of the present disclosure.

FIG. 12 is a flowchart diagram 1200 of a method for solving a multi-dimensional pattern recognition problem using two or more neural networks of lower dimensions, according to an embodiment of the present disclosure. At box 1210, a problem to be solved (a multi-dimensional search problem suitable for solving with neural network pattern recognition) is defined and the dimensions of the problem are divided into sets of grouped dimensions. This was described many times in the preceding discussion and illustrations—including FIGS. 2-7 where the 6-DOF grasp problem was divided into positional dimensions p (x,y,z) and rotational dimensions r (r1,r2,r3), and other examples where 3-DOF and 5-DOF grasp searches were divided into two sets of grouped dimensions and 7-DOF grasp searches were divided into three sets of grouped dimensions.

At box 1220, two or more neural networks are provided, where one neural network is provided for each of the sets of grouped dimensions from the box 1210. The neural networks are concatenated in series (for inference mode) as shown in the preceding figures and discussed extensively. The neural networks run on a computer such as the computer 120 of FIG. 1. Each of the neural networks encodes its own set of group dimensions, plus the sets of grouped dimensions from other neural networks upstream in the series. For example, in FIGS. 2-4, the first neural network encodes the p dimensions, and the second network encodes both p and r dimensions. In the three-network example of FIG. 11, the first network encodes the approach direction degrees of freedom, the second network encodes the grasp position degrees of freedom in conjunction with the approach direction, and the third network encodes the gripper angle and width degrees of freedom in conjunction with the grasp position and the approach direction.

At box 1230, the two or more neural networks are independently trained using supervised learning. The supervised learning technique involves providing each network with a large number of training examples, where each example includes both inputs and desired outputs of the network. For example, in FIG. 4, the first neural network 410 is trained by providing the depth images 420 (at multiple layers) and corresponding quality maps 430 (designating grasp quality at various points on each depth image layer), and the second neural network 460 is trained by providing the rotated cropped depth images 480 and the quality metric output data 490. In a two-network system, the first network is trained to encode its set of grouped dimensions, while hiding the remaining set of grouped dimensions, using the maximal margin technique which was first discussed in connection with FIGS. 3 and 4. In a three-network system, the first two networks may use the maximal margin technique for training. In the maximal margin method, a neural network finds target values of its corresponding set of grouped dimensions having an optimal value of an output variable (such as quality). The target values are then used as inputs by others of the neural networks downstream in the series.

At box 1240, the neural networks are run in inference mode, where an input defining an environment of the problem is provided, and each of the neural networks searches only its corresponding set of grouped dimensions to find the target values. The target values output from each of the neural networks are used as inputs by others of the neural networks downstream in the series. For example, in a two-network system, the input depth image is the only input provided to the first neural network and is used by the first neural network to compute a grasp quality map output having the target values of position coordinates (first set of grouped dimensions) of high quality grasps. The input depth image and the quality map are then provided as input to the second neural network (further processed such as by cropping and rotation) and are used by the second neural network to compute the target values of rotations (second set of grouped dimensions) of high quality grasps.

At box 1250, the outputs of the two or more neural networks are combined to provide a final output. In the two-network example discussed with respect to the box 1240, the highest quality metric value is selected; the corresponding target values of the second set of grouped dimensions are then combined with the target values of the first set of grouped dimensions (from the first neural network) to make up the complete and final output. In the case of grasp searching from depth images, the final output is the concatenated sets of dimensions or degrees of freedom corresponding to the highest quality grasp.

The disclosed methods for neural network modularization to learn high dimensional robot tasks offer many advantages over previously known methods. One great advantage of the disclosed methods is fast computation, because searching in a high-dimensional action space (e.g., 5 or more DOF) is avoided. Separation of the search dimensions into two or three neural networks offers a computation speed improvement factor of several orders of magnitude, as described above. This complexity reduction and speed improvement makes it possible to compute high-dimensional tasks that were simply not practical using existing methods.

The decoupling of the search space of the different neural networks allows the type of neural network to be optimally chosen for each task—such as fully convolutional networks for image in/image out computation, and a convolutional neural network to be used for a final scalar output computation. In addition, network design and performance are transparent and easy to analyze. In the disclosed technique, each network searches a separate portion of the control action space, and each network is trained independently from other networks. Therefore, the performance of each network can be analyzed independently without considering the outputs from other networks. The network decoupling or modularization is enabled by using the maximal margin technique for encoding one network's set of grouped dimensions while hiding others.

Throughout the preceding discussion, various computers and controllers are described and implied. It is to be understood that the software applications and modules of these computers and controllers are executed on one or more computing devices having a processor and a memory module. In particular, this includes a processor in the robot controller 110 which controls the robot performing the object grasping, in the computer 120 and in any other computer which is used for neural network training and inference/execution. Specifically, the processors in the computer(s) are configured to perform the image analysis, neural network training and execution in the manner described throughout the foregoing disclosure—for grasp learning or other neural network applications.

While a number of exemplary aspects and embodiments of the disclosed techniques for robot grasp learning using modularized neural networks have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A robotic grasp computation method, said method comprising:
   dividing a desired set of robotic grasp degrees of freedom into two mutually exclusive sets of grouped dimensions;
   providing two neural networks concatenated in series running on a computer having a processor and memory, where a first neural network encodes a first set of grouped dimensions, and a second neural network, positioned after the first neural network in the series, encodes both the first set and a second set of grouped dimensions;
   independently training the neural networks using supervised learning, where the first neural network is trained using a maximal margin technique to identify target values of the first set of grouped dimensions;
   running the neural networks in inference mode, where a depth image depicting a pile of objects is provided, and each of the neural networks searches only its corresponding set of grouped dimensions to identify the target values, and the target values from the first neural network are used as inputs by the second neural network; and
   combining outputs of the neural networks to provide values of the robotic grasp degrees of freedom.

2. The method according to claim 1 further comprising controlling a robot to grasp an object using the values of the robotic grasp degrees of freedom.

3. The method according to claim 1 wherein the desired set of robotic grasp degrees of freedom include x and y horizontal position dimensions in the first set of grouped dimensions and a z vertical position in the second set of grouped dimensions.

4. The method according to claim 1 wherein the desired set of robotic grasp degrees of freedom include x, y and z positional dimensions in the first set of grouped dimensions and either a gripper rotation angle or a gripper width, or both, in the second set of grouped dimensions.

5. The method according to claim 1 wherein the desired set of robotic grasp degrees of freedom include x, y and z positional dimensions in the first set of grouped dimensions and three rotational dimensions in the second set of grouped dimensions.

6. The method according to claim 1 further comprising a third neural network, positioned before the first neural network in the series, which encodes only a third set of grouped dimensions, wherein the first and second neural networks both also encode the third set of grouped dimensions.

7. The method according to claim 6 wherein the desired set of robotic grasp degrees of freedom include x, y and z positional dimensions in the first set of grouped dimensions, a gripper rotation angle and a gripper width in the second set of grouped dimensions, and two grasp approach direction dimensions in the third set of grouped dimensions.

8. The method according to claim 1 wherein the first neural network is a fully convolutional network which receives image data input and provides image data output, and the second neural network is a convolutional neural network which receives image data input and provides scalar data output.

9. The method according to claim 1 wherein training the neural networks includes providing to each of the networks a plurality of training samples, each of the training samples including a training depth image of a pile of objects and one or more corresponding training grasps, where each training grasp includes a grasp quality and the robotic grasp degrees of freedom.

10. The method according to claim 9 wherein the training samples are provided by a data generation system which computes a plurality of grasps of objects by a gripper, simulates physical environments comprising random piles of the objects, evaluates the grasps applied to the random piles of the objects, and outputs the training depth images of the random piles of objects and corresponding successful simulated grasps.

11. The method according to claim 1 wherein the maximal margin technique includes identifying the target values of the first set of grouped dimensions having an optimal value of grasp quality for any one combination of the target values of the second set of grouped dimensions.

12. The method according to claim 1 wherein running the neural networks in inference mode includes identifying maximal margin target values of the first set of grouped dimensions by the first neural network, and using both the depth image depicting the pile of objects and the target values of the first set of grouped dimensions to identify target values of the second set of grouped dimensions by the second neural network.

13. The method according to claim 1 wherein data preparation techniques used for training the neural networks include providing layers of a training depth image to the first neural network and providing rotated cropped training depth image patches to the second neural network, and data preparation techniques used for running the neural networks in inference mode include providing layers of the depth image to the first neural network and providing rotated cropped depth image patches to the second neural network.

14. A robotic grasp computation method, said method comprising:
   dividing a desired set of robotic grasp degrees of freedom into three mutually exclusive sets of grouped dimensions;
   providing three neural networks concatenated in series running on a computer having a processor and memory, where a first neural network encodes a first set of grouped dimensions, a second neural network positioned after the first neural network in the series encodes both the first set and a second set of grouped dimensions, and a third neural network positioned after the second neural network in the series encodes both the first and second sets and a third set of grouped dimensions;
   independently training the neural networks using supervised learning, where the first neural network is trained using a maximal margin technique to identify target values of the first set of grouped dimensions and the second neural network is trained using the maximal margin technique to identify target values of the second set of grouped dimensions;
   running the neural networks in inference mode, where a depth image depicting a pile of objects is provided, and each of the neural networks searches only its corresponding set of grouped dimensions to identify the target values, and the target values from each of the neural networks are used as inputs by others of the neural networks downstream in the series; and combining outputs of the neural networks to provide values of the robotic grasp degrees of freedom.

15. The method according to claim 14 further comprising controlling a robot to grasp an object using the values of the robotic grasp degrees of freedom.

16. The method according to claim 14 wherein the desired set of robotic grasp degrees of freedom include two grasp approach direction dimensions in the first set of grouped dimensions, x, y and z grasp position dimensions in the second set of grouped dimensions, and a gripper rotation angle and a gripper width in the third set of grouped dimensions.

17. The method according to claim 16 wherein identifying target values of the approach direction dimensions by the first neural network includes converting a point cloud associated with the depth image into synthetic depth images from a plurality of randomly sampled approach directions, and predicting grasp quality for each of the randomly sampled approach directions.

18. The method according to claim 17 wherein identifying target values of the grasp position dimensions by the second neural network includes selecting one of the synthetic depth images associated with a selected approach direction as input, encoding height into the selected synthetic depth image by cutting slices perpendicular to the selected approach direction, generating grasp quality maps for each of the slices, and selecting a best grasp quality point.

19. The method according to claim 18 wherein identifying target values of the gripper rotation angle and gripper width by the third neural network includes using the selected synthetic depth image associated with the selected approach direction and grasp position as input, cropping image patches from the selected synthetic depth image at a plurality of different gripper angles around the grasp position, identifying a grasp quality for each of the image patches, and selecting the image patch having the highest grasp quality.

20. The method according to claim 14 wherein the desired set of robotic grasp degrees of freedom include two grasp approach direction dimensions in the first set of grouped dimensions, x and y horizontal position dimensions and a gripper rotation angle in the second set of grouped dimensions, and a z vertical position dimension and a gripper width in the third set of grouped dimensions.

21. The method according to claim 14 wherein the and second neural networks are fully convolutional networks which receives image data input and provides image data output, and the third neural network is a convolutional neural network which receives image data input and provides scalar data output.

22. The method according to claim 14 wherein training the neural networks includes providing to each of the networks a plurality of training samples, each of the training samples including a training depth image of a pile of objects and one or more corresponding training grasps, where each training grasp includes a grasp quality and the robotic grasp degrees of freedom.

23. The method according to claim 22 wherein the training samples are provided by a data generation system which computes a plurality of grasps of objects by a gripper, simulates physical environments comprising random piles of the objects, evaluates the grasps applied to the random piles of the objects, and outputs the training depth images of the random piles of objects and corresponding successful simulated grasps.

24. The method according to claim 14 wherein the maximal margin technique includes identifying the target values of the first set of grouped dimensions having an optimal value of grasp quality for any one combination of the target values of the second and third sets of grouped dimensions, and identifying the target values of the second set of grouped dimensions having an optimal value of grasp quality for any one combination of the target values of the third set of grouped dimensions.

25. The method according to claim 14 wherein running the neural networks in inference mode includes identifying maximal margin target values of the first set of grouped dimensions by the first neural network and using both the depth image depicting the pile of objects and the target values of the first set of grouped dimensions to identify target values of the second set of grouped dimensions by the second neural network, and identifying maximal margin target values of the second set of grouped dimensions by the second neural network and using both the depth image depicting the pile of objects and the target values of the first and second sets of grouped dimensions to identify target values of the third set of grouped dimensions by the third neural network.

26. A system for robotic grasping of objects, said system comprising:
one or more 3D cameras providing depth image of a pile of objects during live robotic operations;
a computer having a processor and memory, said computer configured to:
divide a desired set of robotic grasp degrees of freedom into two mutually exclusive sets of grouped dimensions;
run two neural networks concatenated in series, where a first neural network encodes a first set of grouped dimensions, and a second neural network positioned after the first neural network in the series encodes both the first set and a second set of grouped dimensions;
independently train the neural networks using supervised learning, where the first neural network is trained using a maximal margin technique to identify target values of the first set of grouped dimensions;
run the neural networks in inference mode using the depth image from the one or more 3D cameras, where each of the neural networks searches only its corresponding set of grouped dimensions to identify that set's target values, and the target values from the first neural network are used as inputs by the second neural network; and
combine outputs of the neural networks to provide values of the robotic grasp degrees of freedom;
a robot controller in communication with and receiving the robotic grasp degrees of freedom from the computer; and
a robot fitted with a gripper to grasp and move a target object based on instructions from the controller.

27. The system according to claim 26 wherein the desired set of robotic grasp degrees of freedom include x and y horizontal position dimensions in the first set of grouped dimensions and a z vertical position in the second set of grouped dimensions.

28. The system according to claim 26 wherein the desired set of robotic grasp degrees of freedom include x, y and z positional dimensions in the first set of grouped dimensions and either a gripper rotation angle or a gripper width, or both, in the second set of grouped dimensions.

29. The system according to claim 26 wherein the desired set of robotic grasp degrees of freedom include x, y and z positional dimensions in the first set of grouped dimensions and three rotational dimensions in the second set of grouped dimensions.

30. The system according to claim 26 further comprising a third neural network, positioned before the first neural network in the series, which encodes only a third set of grouped dimensions, wherein the first and second neural networks both also encode the third set of grouped dimensions.

31. The system according to claim 30 wherein the desired set of robotic grasp degrees of freedom include x, y and z positional dimensions in the first set of grouped dimensions, a gripper rotation angle and a gripper width in the second set of grouped dimensions, and two grasp approach direction dimensions in the third set of grouped dimensions.

32. The system according to claim 26 wherein the first neural network is a fully convolutional network which receives image data input and provides image data output, and the second neural network is a convolutional neural network which receives image data input and provides scalar data output.

33. The system according to claim 26 wherein training the neural networks includes providing to each of the networks a plurality of training samples, each of the training samples including a training depth image of a pile of objects and one or more corresponding training grasps, where each training grasp includes a grasp quality and the robotic grasp degrees of freedom.

34. The system according to claim 33 wherein the training samples are provided by a data generation system which computes a plurality of grasps of objects by a gripper, simulates physical environments comprising random piles of the objects, evaluates the grasps applied to the random piles of the objects, and outputs the training depth images of the random piles of objects and corresponding successful simulated grasps.

35. The system according to claim 26 wherein the maximal margin technique includes identifying the target values of the first set of grouped dimensions having an optimal value of grasp quality for any one combination of the target values of the second set of grouped dimensions.

36. The system according to claim 26 wherein running the neural networks in inference mode includes identifying maximal margin target values of the first set of grouped dimensions by the first neural network, and using both the depth image depicting the pile of objects and the target values of the first set of grouped dimensions to identify target values of the second set of grouped dimensions by the second neural network.

37. The system according to claim 26 wherein data preparation techniques used for training the neural networks include providing layers of a training depth image to the first neural network and providing rotated cropped training depth image patches to the second neural network, and data preparation techniques used for running the neural networks in inference mode include providing layers of the depth image to the first neural network and providing rotated cropped depth image patches to the second neural network.

* * * * *